(12) United States Patent
Hovis et al.

(10) Patent No.: US 10,699,222 B2
(45) Date of Patent: Jun. 30, 2020

(54) VISUAL INFORMATION SYSTEM AND COMPUTER MOBILITY APPLICATION FOR FIELD PERSONNEL

(75) Inventors: Allan Hovis, Raleigh, NC (US); David Paterson, Durham, NC (US)

(73) Assignee: BASF AGRO TRADEMARKS GMBH, Ludwigshafen (DE)

( * ) Notice: Subject to any disclaimer, the term of this patent is extended or adjusted under 35 U.S.C. 154(b) by 908 days.

(21) Appl. No.: 14/111,219

(22) PCT Filed: Apr. 13, 2012

(86) PCT No.: PCT/US2012/033495
§ 371 (c)(1),
(2), (4) Date: Jan. 15, 2014

(87) PCT Pub. No.: WO2012/142395
PCT Pub. Date: Oct. 18, 2012

(65) Prior Publication Data
US 2014/0136286 A1    May 15, 2014

Related U.S. Application Data

(60) Provisional application No. 61/475,962, filed on Apr. 15, 2011, provisional application No. 61/540,854, filed on Sep. 29, 2011.

(51) Int. Cl.
*G06Q 30/00* (2012.01)
*G06Q 10/06* (2012.01)
(Continued)

(52) U.S. Cl.
CPC .......... *G06Q 10/063* (2013.01); *A01B 69/00* (2013.01); *A01B 79/005* (2013.01); *G06F 16/29* (2019.01);
(Continued)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS 5,897,619 A * 4/1999 Hargrove, Jr. ......... A01B 79/00
705/317
2003/0187560 A1* 10/2003 Keller ................... A01B 79/005
701/50

(Continued)

OTHER PUBLICATIONS

Ward et al., Identifying populations potentially exposed to agricultural pesticides using remote sensing and a Geographic Information System. Environmental Health Perspectives, vol. 108., No. 1, Jan. 2000. (Year: 2000).*

*Primary Examiner* — Patricia H Munson
*Assistant Examiner* — Uche Byrd
(74) *Attorney, Agent, or Firm* — Lowenstein Sandler LLP

(57) ABSTRACT

A system for providing visual crop data to a mobile device includes at least one server computer in communication with a mobile device. The at least one server computer is configured to receive location data relating to a geographical position of the mobile device; retrieve topographical data associated with at least a portion of the location data; generate shape data based at least partially on the topographical data; and transmit at least a portion of the shape data to the mobile device, such that at least one shape is visually displayed on at least a portion of a map image displayed on the mobile device. Also disclosed is a computer-implemented method and computer program product for providing and/or interacting with visual crop data, including appropriately communicatively connected hardware components.

24 Claims, 14 Drawing Sheets

(51) Int. Cl.
| | |
|---|---|
| *A01B 69/00* | (2006.01) |
| *G09B 29/10* | (2006.01) |
| *A01B 79/00* | (2006.01) |
| *G06F 16/29* | (2019.01) |
| *G06Q 30/02* | (2012.01) |
| *G06Q 50/02* | (2012.01) |

(52) U.S. Cl.
CPC ....... *G06Q 30/018* (2013.01); *G06Q 30/0205* (2013.01); *G06Q 50/02* (2013.01); *G09B 29/106* (2013.01)

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | | |
|---|---|---|---|
| 2005/0149235 A1* | 7/2005 | Seal ..................... | A01B 79/005 700/283 |
| 2005/0228585 A1* | 10/2005 | Pickett .................. | G01C 15/00 701/409 |
| 2007/0273518 A1* | 11/2007 | Lupoli .................. | G06Q 10/08 340/572.1 |
| 2009/0164281 A1* | 6/2009 | Norgaard ................ | A01G 1/00 47/58.1 SE |
| 2010/0182145 A1* | 7/2010 | Ungari .................. | G09B 29/10 340/539.13 |
| 2014/0002489 A1* | 1/2014 | Sauder ................ | A01B 79/005 345/629 |

\* cited by examiner

| County + SoilNum | County | County State | Soil Number | Soil Name | Soil Type | Vulnerable | Hex Color | Data |
|---|---|---|---|---|---|---|---|---|
| HILLSBOROUGH~10 | HILLSBOROUGH | FL | 10 | Chobee loamy fine | 1,428.0 0.2% | N | FAEBD7 | HILLSBOROUGH |
| HILLSBOROUGH~100 | HILLSBOROUGH | FL | 100 | Waters of the Gulf, | 81,873.1 10.6% | Y | FAEBD7 | HILLSBOROUGH |
| HILLSBOROUGH~11 | HILLSBOROUGH | FL | 11 | Chobee muck, dep | 816.6 0.1% | N | FAEBD7 | HILLSBOROUGH |
| HILLSBOROUGH~12 | HILLSBOROUGH | FL | 12 | Chobee sandy loam | 12,785.5 1.7% | N | FAEBD7 | HILLSBOROUGH |
| HILLSBOROUGH~13 | HILLSBOROUGH | FL | 13 | Eaton fine sand | 337.3 0.0% | N | FAEBD7 | HILLSBOROUGH |
| HILLSBOROUGH~14 | HILLSBOROUGH | FL | 14 | Eaton mucky sand | 528.2 0.1% | N | FAEBD7 | HILLSBOROUGH |
| HILLSBOROUGH~15 | HILLSBOROUGH | FL | 15 | Felda fine sand | 4,981.4 0.6% | N | FAEBD7 | HILLSBOROUGH |
| HILLSBOROUGH~16 | HILLSBOROUGH | FL | 16 | Felda fine sand, oc | 1,259.7 0.2% | N | FAEBD7 | HILLSBOROUGH |
| HILLSBOROUGH~17 | HILLSBOROUGH | FL | 17 | Floridana fine sand | 676.0 0.1% | N | FAEBD7 | HILLSBOROUGH |
| HILLSBOROUGH~18 | HILLSBOROUGH | FL | 18 | Fort Meade loamy f | 7,416.6 1.0% | N | FAEBD7 | HILLSBOROUGH |
| HILLSBOROUGH~19 | HILLSBOROUGH | FL | 19 | Gainesville loamy fi | 2,818.4 0.4% | N | FAEBD7 | HILLSBOROUGH |
| HILLSBOROUGH~2 | HILLSBOROUGH | FL | 2 | Adamsville fine san | 1,356.6 0.2% | Y | DC143C | HILLSBOROUGH |
| HILLSBOROUGH~20 | HILLSBOROUGH | FL | 20 | Gypsum land | 945.2 0.1% | N | FAEBD7 | HILLSBOROUGH |
| HILLSBOROUGH~21 | HILLSBOROUGH | FL | 21 | Immokalee fine san | 15,573.0 2.0% | N | FAEBD7 | HILLSBOROUGH |
| HILLSBOROUGH~22 | HILLSBOROUGH | FL | 22 | Immokalee-Urban l | 2,430.4 0.3% | N | FAEBD7 | HILLSBOROUGH |
| HILLSBOROUGH~23 | HILLSBOROUGH | FL | 23 | Kendrick fine sand | 329.0 0.0% | N | FAEBD7 | HILLSBOROUGH |
| HILLSBOROUGH~24 | HILLSBOROUGH | FL | 24 | Keeson muck, freq | 5,388.5 0.7% | N | FAEBD7 | HILLSBOROUGH |
| HILLSBOROUGH~25 | HILLSBOROUGH | FL | 25 | Lake fine sand, 0 t | 13,903.6 1.8% | Y | DC143C | HILLSBOROUGH |
| HILLSBOROUGH~26 | HILLSBOROUGH | FL | 26 | Lochloosa-Micanop | 480.0 0.1% | N | FAEBD7 | HILLSBOROUGH |
| HILLSBOROUGH~27 | HILLSBOROUGH | FL | 27 | Malabar fine sand | 30,675.9 4.0% | N | FAEBD7 | HILLSBOROUGH |
| HILLSBOROUGH~28 | HILLSBOROUGH | FL | 28 | Millhopper-Urban la | 453.4 0.1% | N | FAEBD7 | HILLSBOROUGH |
| HILLSBOROUGH~29 | HILLSBOROUGH | FL | 29 | Myakka fine sand | 163,589.6 21.2% | N | FAEBD7 | HILLSBOROUGH |
| HILLSBOROUGH~3 | HILLSBOROUGH | FL | 3 | Archbold fine sand | 6,960.6 0.9% | Y | DC143C | HILLSBOROUGH |

FIG. 8

| County | Start Lat | Start Lon | Shape Parent | Style URL | Soil # | Soil Name |
|---|---|---|---|---|---|---|
| Highlands | 27.02329924 | -81.28646566 | 3 | #shp2kml22 | 3 | 3 |
| Highlands | 27.02329512 | -81.29623232 | 35 | #shp2kml22 | 35 | 35 |
| Highlands | 27.02329326 | -81.31261969 | 3 | #shp2kml22 | 3 | 3 |
| Highlands | 27.02329127 | -81.31616666 | 14 | #shp2kml22 | 14 | 14 |
| Highlands | 27.02328153 | -81.39916133 | 12 | #shp2kml22 | 12 | 12 |
| Highlands | 27.02328163 | -81.46562668 | 10 | #shp2kml22 | 10 | 10 |
| Highlands | 27.02326231 | -81.49623233 | 35 | #shp2kml22 | 35 | 35 |
| Highlands | 27.02323121 | -81.52326468 | 39 | #shp2kml22 | 39 | 39 |
| Highlands | 27.02321258 | -81.52365659 | 3 | #shp2kml22 | 3 | 3 |
| Highlands | 27.02236948 | -81.53262946 | 3 | #shp2kml22 | 3 | 3 |
| Highlands | 27.02249433 | -81.23262995 | 26 | #shp2kml22 | 26 | 26 |

FIG. 9

| Territory Name | Info | Hows Num | Owner Company | County | Drinking Wells | Block | Location | Latitude | Longitude | Distance From |
|---|---|---|---|---|---|---|---|---|---|---|
| Dave Smith | Hines | 0 | | | | Deaton City | Houses off of Deaso | 27.45428 | -81.40225 | |
| Dave Smith | Hines | 0 | | | | Lake Isabel | N.E. Corner | 27.6741 | -81.47361 | |
| Dave Smith | Hines | 0 | | | | Swan 2-4 | | 27.54436 | -81.65473 | |
| Dave Smith | Hines | 0 | | | | Swan 1 | | 27.54248 | -81.65546 | |
| Dave Smith | Miller | 0 | | | | Sun Valley | Blue Home 111 yds | 27.31123 | -81.68910 | |
| Dave Smith | Miller | 0 | | | | Block off of Brown, 31 yds East of | | 27.33027 | -81.65326 | |
| Dave Smith | Hines | 0 | | | | Deaton City | | 27.45686 | -81.40258 | |
| Dave Smith | Christopher | 0 | | | | Roemer | NW Side | 27.280461 | -81.834624 | |
| Dave Smith | David Bass | 0 | Blue Goose | | 1 | Dude | North of block 5 in | 27.31101 | -80.44306 | Exact point |
| Dave Smith | Barnes | 0 | BMB | | 2 | Vero | Well at House, near | 27.53573 | -80.59805 | Exact Point |
| Dave Smith | Chancy | 0 | Brant Monk | | 1 | Orange Grove | West of grove | 27.555904 | -80.827518 | Exact point |
| Dave Smith | Paul | 0 | Bright Tiger | | 3 | Orange Grove | At Shop | 27.46834 | -80.85844 | Exact Point |
| Jane Bell | Cofer | 0 | Cassens | St. Lucie | 1 | Vam Gandy | House in middle of | 27.44003 | -80.403413 | exact point |
| Jane Bell | Schurrard | 0 | Cassens | | 1 | Orange Harmony | House South of Gr. | 27.88124 | -80.61092 | 80 yards South |
| Jane Bell | David Bass | 0 | Edsall groves | | 1 | Burrell 1 | East of Block By H. | 27.63673 | -80.54549 | 60 yards North |
| Jane Bell | David Bass | 0 | Egan Bernard | | 3 | Cow Creek | By Barn in grove | 27.44715 | -80.6685 | Exact Point |
| Jane Bell | Cofer | 0 | Evans Properties | | 1 | 2 G's | Behind 2 G's store | 27.38193 | -80.47327 | 40 yards to South |
| Jane Bell | David Bass | 0 | Golden River | | 1 | Lambeth 19 | House on road | 27.63459 | -80.59571 | Exact Point |
| Jane Bell | Merlin | 0 | Graves Brothers | | 1 | West River Grove | East side of grove | 26.39929 | -81.25142 | Exact point |
| Jane Bell | Merlin | 0 | Green Citrus | | 2 | Indian River | Between barn and | 27.53216 | -80.57861 | Exact point |

FIG. 10

| County HOV/S Num | PUPS Num | DACS Num | Applicator | License Num | App Email | App Address | App City | App State | App Zip |
|---|---|---|---|---|---|---|---|---|---|
| ▸ BREVARD | | | | | | | | | |
| ▾ COLLIER | | | | | | | | | |
| 098 | PUPS-65-10 | 18-0129 | DANIEL | M12893 | customcitruscare@ | PO BOX 26 204 | LABELLE | FL | 33975 |
| 102 | PUPS-69-10 | 18-0129 | DANIEL | M12893 | customcitruscare@ | PO BOX 26 204 | LABELLE | FL | 33975 |
| 265 | PUPS-33-10 | 18-0594 | DANIEL | M472 | customcitruscare@ | PO BOX 26 | LABELLE | FL | 33975 |
| 268 | PUPS-37-10 | 18-0594 | DANIEL | M472 | customcitruscare@ | PO BOX 26 | LABELLE | FL | 33975 |
| 263 | PUPS-38-10 | 18-0594 | DANIEL | M472 | customcitruscare@ | PO BOX 26 | LABELLE | FL | 33975 |
| 269 | PUPS-38-10 | 18-0594 | DANIEL | M472 | customcitruscare@ | PO BOX 26 | LABELLE | FL | 33975 |
| 274 | PUPS-42-10 | 18-0594 | DANIEL | M472 | customcitruscare@ | PO BOX 26 | LABELLE | FL | 33975 |
| 276 | PUPS-44-10 | 18-0594 | DANIEL | M472 | customcitruscare@ | PO BOX 26 | LABELLE | FL | 33975 |
| 280 | PUPS-48-10 | 18-0594 | DANIEL | M472 | customcitruscare@ | PO BOX 26 | LABELLE | FL | 33975 |
| 281 | PUPS-49-10 | 18-0594 | DANIEL | M472 | customcitruscare@ | PO BOX 26 | LABELLE | FL | 33975 |
| 284 | PUPS-49-10 | 18-0594 | DANIEL | M472 | customcitruscare@ | PO BOX 26 | LABELLE | FL | 33975 |
| 291 | PUPS-21-10 | 18-0329 | DANIEL | M472 | customcitruscare@ | PO BOX 26 | LABELLE | FL | 33975 |
| 291 | PUPS-21-10 | 18-0329 | DANIEL | M472 | customcitruscare@ | PO BOX 26 | LABELLE | FL | 33975 |
| 292 | PUPS-22-10 | 18-0329 | DANIEL | M472 | customcitruscare@ | PO BOX 26 | LABELLE | FL | 33975 |
| 293 | PUPS-23-10 | 18-0329 | DANIEL | M472 | customcitruscare@ | PO BOX 26 | LABELLE | FL | 33975 |
| 305 | PUPS-06-10 | 18-0365 | DANIEL | M472 | customcitruscare@ | PO BOX 26 | LABELLE | FL | 33975 |
| 310 | PUPS-11-10 | 18-0365 | DANIEL | M472 | customcitruscare@ | PO BOX 26 | LABELLE | FL | 33975 |
| 320 | PUPS-33-10 | 18-0332 | DANIEL | M472 | customcitruscare@ | PO BOX 26 | LABELLE | FL | 33975 |
| 320 | PUPS-33-10 | 18-0332 | DANIEL | M472 | customcitruscare@ | PO BOX 26 | LABELLE | FL | 33975 |
| 322 | PUPS-35-10 | 18-0332 | DANIEL | M472 | customcitruscare@ | PO BOX 26 | LABELLE | FL | 33975 |
| 324 | PUPS-37-10 | 18-0332 | DANIEL | M472 | customcitruscare@ | PO BOX 26 | LABELLE | FL | 33975 |

FIG. 11

|    |                  |                              |
|----|------------------|------------------------------|
|    | HOVIS Num        | 2415                         |
|    | MONITOR          |                              |
| 0  | PUPS Num         | PUPS-9984-10                 |
| 1  | DACS Num         | 10-9998                      |
| 2  | Applicator       | DANIEL SMITH                 |
| 3  | License Num      | CM32                         |
| 4  | App Email        | customcitruscare@data.com    |
| 5  | App Address      | PO BOX 3333                  |
| 6  | App City         | SMITH                        |
| 7  | App State        | FL                           |
| 8  | App Zip          | 33979                        |
| 9  | App Phone        | 863-555-5443                 |
| 10 | Grower           | SMITHS FARM                  |
| 11 | Grower Contact   | Jeff Johnson                 |
| 12 | Grower Address   | 1300 North Maple St          |
| 13 | Grower City      | Immokalee                    |
| 14 | Grower State     | FL                           |
| 15 | Grower Zip       | 34333                        |
| 16 | Grower Phone     | 555-555-5188                 |
| 17 | Monitor Name     | MARGO DARPA                  |
| 18 | Date Monitored   | 2/17/2010                    |
| 19 | Product Brand    | TEMIK 15G ALDICARB PESTICIDE |
| 20 | Target Site      | CITRUS                       |
| 21 | Status           |                              |
| 22 | App Site         | Jimmins                      |
| 23 | County           | COLLIER                      |
| 24 | Township         | 27S                          |
| 25 | Range            | 49E                          |
| 26 | Section          | 6                            |
| 27 | Acres            | 100                          |
| 28 | Wells Drinking   | 0                            |
| 29 | Wells NonDrinking| 1                            |
| 30 | Well Permit Num  |                              |
| 31 | Well Desc        |                              |
| 32 | Well Latitude    |                              |
| 33 | Well Longitude   |                              |
| 34 | Well Depth       |                              |
| 35 | Well Diameter    |                              |
| 36 | Well Cased       |                              |
| 37 | Well Case Depth  |                              |
| 38 | Well Setback     |                              |
| 39 | Offset Distance  |                              |
| 40 | Offset Direction |                              |
| 41 | App Date         | 1/20/2010                    |
| 42 | Status Date      | 2/17/2010                    |
| 43 | App Period Start |                              |
| 44 | App Period End   |                              |
| 45 | App Grove        | SMITHS FARM                  |
| 46 | Grove Lat NW     |                              |
| 47 | Grove Lon NW     |                              |

FIG. 12

VISUAL INFORMATION SYSTEM AND COMPUTER MOBILITY APPLICATION FOR FIELD PERSONNEL

CROSS REFERENCE TO RELATED APPLICATIONS

This application claims benefit of priority from U.S. Provisional Patent Application No. 61/475,962, filed Apr. 15, 2011, and U.S. Provisional Patent Application No. 61/540,854, filed Sep. 29, 2011, both of which are incorporated herein by reference in their entirety.

BACKGROUND OF THE INVENTION

Field of the Invention

This invention relates generally to soil and crop analysis and, more specifically, to a visual information system for accessing pertinent information and features present in a specified area scheduled for the application of agricultural chemicals or for the cultivating of genetically modified crops.

Background of the Invention

Agricultural products, including those applied to soil and/or crops such as granular crop protection chemicals, are used to control insects, mites, and nematodes that can damage crops. These agricultural chemicals are typically water soluble and, therefore, care should be taken to prevent the chemicals from leaching into groundwater. In most cases, these conventional crop protection chemicals rapidly decompose into harmless residues in the environment after application. However, a combination of sandy and acidic soil conditions can reduce the degradation of the chemicals and allow the movement of some of the chemicals into the groundwater if care is not taken during application.

To protect groundwater supplies used for human drinking water, these agricultural chemicals are typically not applied within fifty feet of drinking water wells. The state of Florida has more restrictive setback requirements which prevent some of these chemicals from being applied within three hundred feet of any drinking water well. In addition, Florida also mandates that some products cannot be used on citrus plants within one thousand feet of a drinking water well when certain "vulnerable" soil types are present unless a set of well construction parameters have been met and documented. Vulnerable soil types are those in which agricultural chemicals may move more easily to the groundwater. These vulnerable soils are identified and mapped by the U.S.D.A. Soil Conservation Service.

It is the responsibility of the applicator to determine where the agricultural product can or cannot be applied. In Florida, a number of "application monitors" work with professional applicators to determine where the agricultural chemicals can be applied. The process involves the grower, the professional applicator (who could be the same person), the Florida Department of Agriculture and Consumer Services (the "State"), and the soil application monitor. Typically, the grower requests the application of certain agricultural chemicals in a designated area. The State assigns a permit number and the application monitor inspects the site and marks any required setbacks from drinking water wells. As used herein, the terms "setback" or "buffer" refer to the distance from an object, such as a well, within which agricultural chemicals should not be applied. For wells, the setback distance depends upon the well construction and the type of soil. The purchase and application of the agricultural chemicals is approved and the chemicals are applied by the applicator. In the past, the records and data used by the application monitor to determine the setback areas were written documents that had to be handled manually.

Genetically modified crops provide various solutions to agricultural efficiency, resulting in increased yields and lower prices. Modified crops also provide solutions to disease, climate change and undesirable soil conditions. For example, the introduction of genetically modified soybeans with increased tolerance for herbicides has made it easier and more profitable for farmers to grow the crop. As recent as 2010, genetically modified crops were grown by 15.4 million farmers on as many as 360 million acres throughout the world. Due to concerns about genetically modified crops, the Environmental Protection Agency (EPA), the Department of Agriculture (USDA) and the Food and Drug Administration (FDA) have created a regulatory scheme that is difficult for farmers and others to navigate. The USDA is concerned with modified crops becoming weeds and the EPA regulates genetically modified crops having pesticide-like properties. Further, state and local governments can prohibit the use of such crops and, possibly, create additional regulations.

Given the numerous regulations regarding genetically modified crops, farmers and other individuals are burdened with the task of compliance. For example, the USDA requires a buffer zone around plots of genetically modified crops to ensure that cross-pollination with other species does not occur. These buffers, defining the allowable plots on which modified crops can be grown, must be considered by farmers when planning their growing season. Staying compliant with these types of regulations requires farmers and others to survey their land, often requiring access to information regarding surrounding crops, ground water and other resources. The buffer zones for genetically modified crops require monitoring to ensure that the crop does not extend past the designated area. Field surveys are generally used to ensure compliance with the regulations. Surveyors/inspectors, who are required to carry many devices and tools into the field, must create a full report for each inspected field. This process is inefficient and requires work to be repeated and for the surveyors to travel often.

In addition to concerns over ground water, state and federal laws also regulate areas populated with endangered species. These laws create buffer zones adjacent to streams, rivers, wetlands and floodplain habitats to protect certain endangered species. These buffer zones define specific sensitive areas that are difficult for farmers and others to survey and plot.

Thus, there is a need for a system that can run on a portable computer or other mobile device to provide real-time data to application monitors when they are in the field. There is also a need for a system that reduces the time required for application monitors to perform their tasks and provides information useful for real-time decision making by the application monitors in the field.

SUMMARY OF THE INVENTION

Generally, provided is a system, method, and computer program product for providing and/or interacting with visual crop data that addresses or overcomes some or all of the deficiencies and drawbacks associated with existing systems.

According to one preferred and non-limiting embodiment of the present invention, provided is a system for providing visual crop data to a mobile device, the system comprising at least one server computer in communication with a mobile device, the at least one server computer configured to: receive, from the mobile device, location data relating to a geographical position of the mobile device; retrieve, from at least one topographical data source, topographical data associated with at least a portion of the location data; generate shape data based at least partially on the topographical data; and transmit at least a portion of the shape data to the mobile device, such that at least one shape is visually displayed on at least a portion of a map image displayed on the mobile device, wherein the at least one shape is based at least partially on the at least a portion of the shape data.

According to another preferred and non-limiting embodiment of the present invention, provided is a computer program product comprising at least one computer-readable medium, the computer-readable medium comprising a program which, when executed by a device having a processor and at least one display unit, causes the device to: transmit location data to at least one host, the location data representing a geographic location; receive shape data representing at least one shape, the at least one shape at least partially corresponding to at least one specific region, wherein at least a portion of the at least one specific region is included in at least a portion of a geographic region; and display, in combination with a visual representation of at least a portion of a geographic region active within the at least one display unit, at least a portion of the at least one shape.

According to a further preferred and non-limiting embodiment of the present invention, provided is a computer-implemented method performed on at least one computer system including at least one processor, the method comprising: receiving, from a mobile device, location data relating to a geographical position of the mobile device; identifying topographical data relating at least partially to the geographical position; and transmitting, to the mobile device, map data and shape data, wherein the map data allows the mobile device to display a visual image representing a geographical region at least partially corresponding to the geographical position, and wherein the shape data is configured to cause the mobile device to display at least one shape representing at least a portion of at least one specified area, and wherein the geographical region at least partially comprises the at least a portion of the at least one specified area.

These and other features and characteristics of the present invention, as well as the methods of operation and functions of the related elements of structures and the combination of parts and economies of manufacture, will become more apparent upon consideration of the following description with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification, the singular form of "a", "an", and "the" include plural referents unless the context clearly dictates otherwise.

BRIEF DESCRIPTION OF THE DRAWINGS

FIG. 8 is a view of a database table storing soil data according to the principles of the present invention;

FIG. 9 is a view of a database table storing soil shape data according to the principles of the present invention;

FIG. 10 is a view of a database table storing well data according to the principles of the present invention;

FIG. 11 is a view of a database table storing grove data according to the principles of the present invention; and FIG. 12 is a view of a database table storing application monitor data according to the principles of the present invention.

DESCRIPTION OF THE PREFERRED EMBODIMENTS

For purposes of the description hereinafter, it is to be understood that the specific systems, processes, functions, and modules illustrated in the attached drawings, and described in the following specification, are simply exemplary embodiments of the invention. Hence, specific characteristics related to the embodiments disclosed herein are not to be considered as limiting. Further, it is to be understood that the invention may assume various alternative variations and step sequences, except where expressly specified to the contrary.

In the following description, numerous specific details are provided, such as network structures, data structures, computing devices, and program instructions to provide a thorough understanding of embodiments of the invention. One skilled in the art will recognize, however, that the invention can be practiced without one or more of the specific details, or with other methods, components, materials, and so forth. In other instances, well-known structures, materials, methods or operations are not shown or described in detail to avoid obscuring aspects of the invention.

Figure 1A:
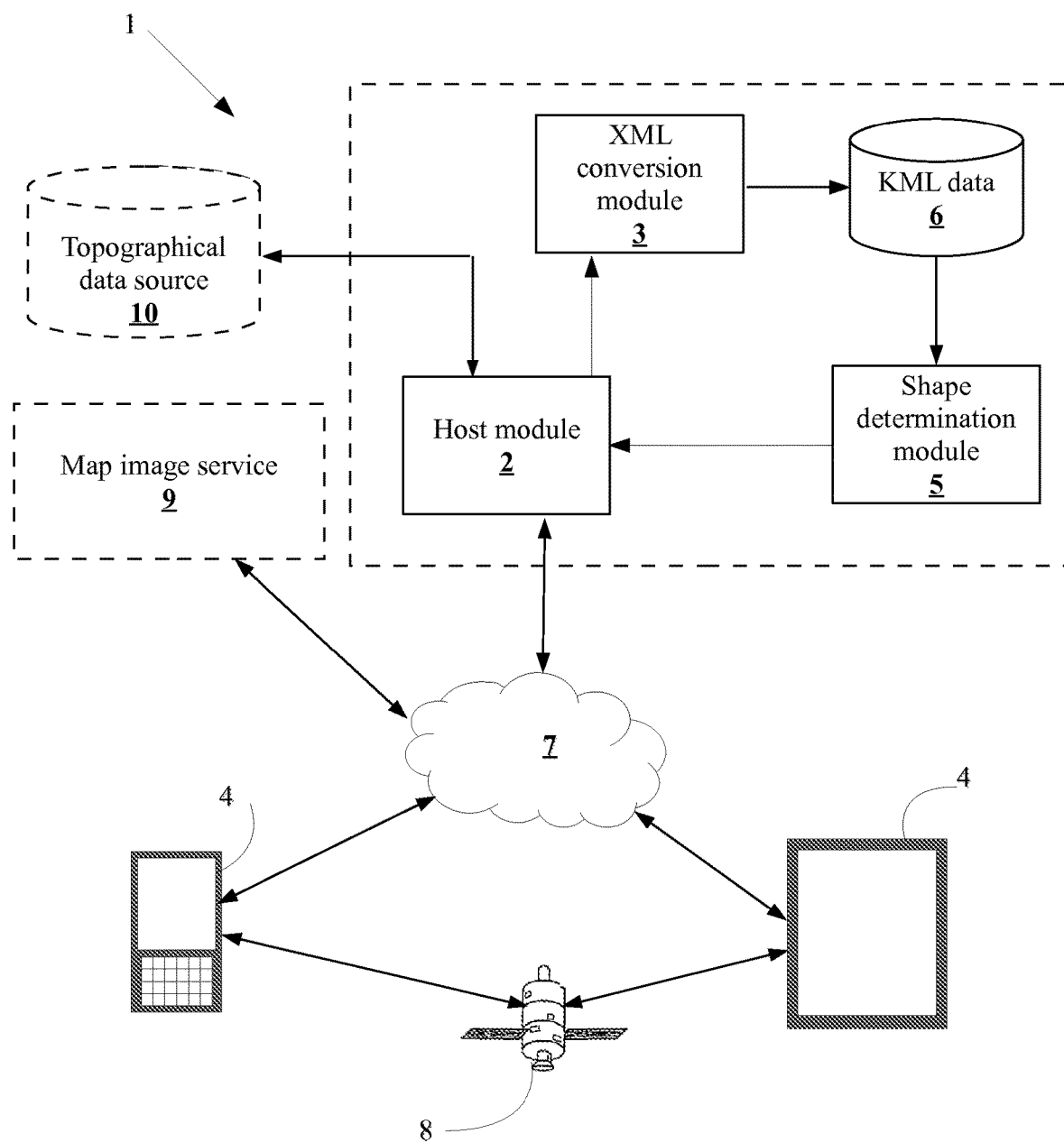
FIGS. 1a and 1b are block diagrams of a visual information system according to the principles of the present invention.

Referring now to FIG. 1a, a visual information system 1 for monitoring crops is shown according to one preferred and non-limiting embodiment of the present invention. The system includes a host module 2 for providing web pages or other forms of content to client computers, such as mobile computers 4. Various forms of data are provided in a streaming format from the host module 2 to the mobile computer 4, based at least partially on the location and/or movement of the mobile computer 4, or actions taken on the mobile computer 4 by a user (e.g., an application monitor, field personnel, farmers, or other individuals).

The mobile computer 4 may be used by an application monitor or other field personnel during examination of a crop such as, for example, citrus groves, in order to provide for the application of agricultural chemicals, the planting of genetically modified crops, or other activities, in accordance with recommended procedures. The visual information system 1 provides targeted mapping information by calculating soil information in a selected area. By targeting information to a selected area, the system 1 reduces the bandwidth requirements necessary to provide the mobile device 4 with the data that it needs. It is to be understood that the mobile computer 4 of the visual information system 1 is not limited for use by application monitors. Other users, such as marketing managers, sales personnel, product managers, applicators, or other individuals, could also use the system 1.

With continued reference to FIG. 1a, the host module 2 is in communication with an XML conversion module 3, a shape determination module 5, and external data sources such as a topographical data source 10. The host module 2 is also in communication with a network environment 7, such as the internet or some other form of communications network. Mobile devices 4 are in communication with the network 7 and with one or more GPS satellites 8. The host module 2 and/or the mobile devices 4, may access other external data sources, such as a map image service 9, to provide satellite image data or other features.

Figure 1B:
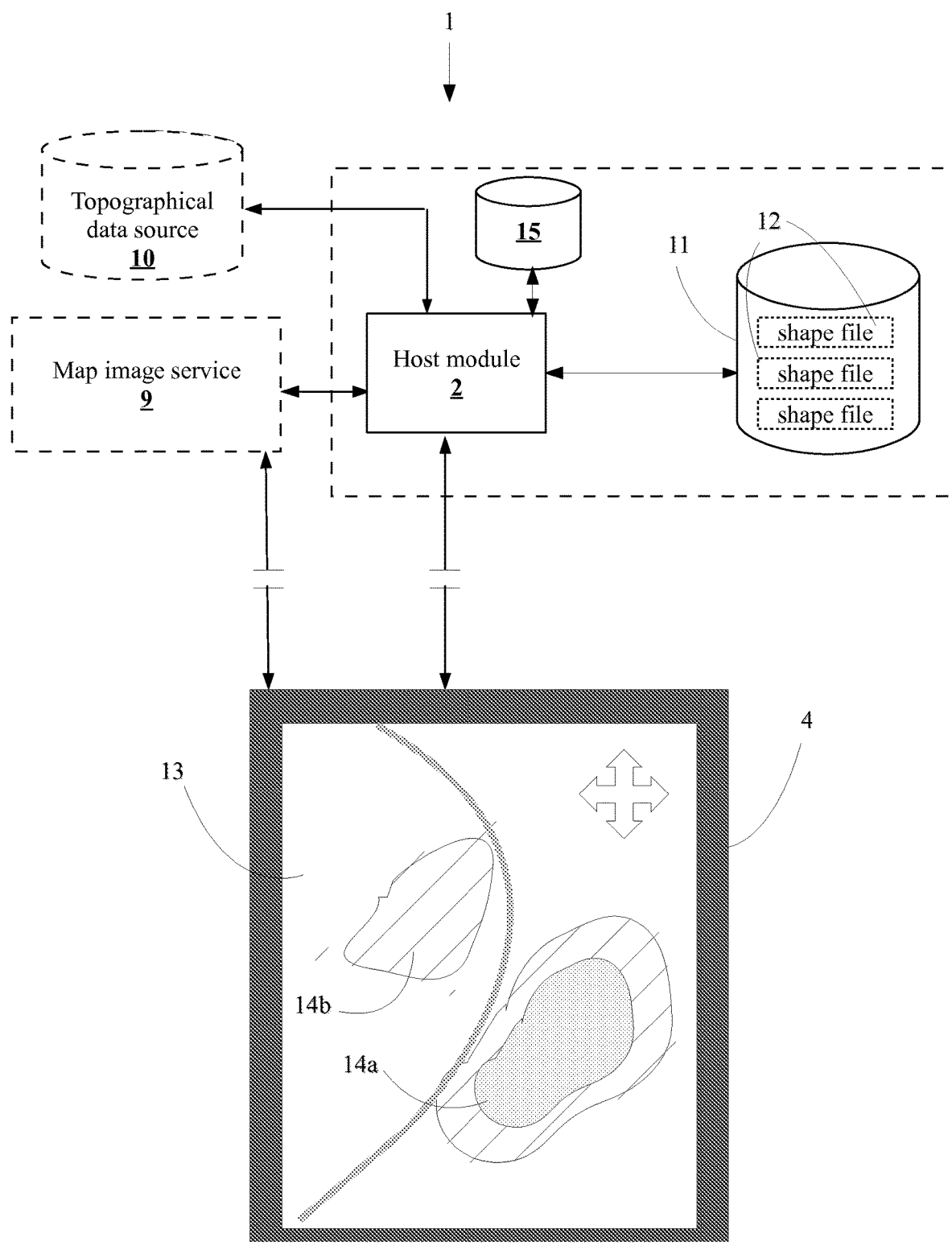

Referring now to FIG. 1b, a further view of the visual information system 1 for monitoring crops is shown according to one preferred and non-limiting embodiment of the present invention. The host module 2 is in communication with shape file database 11, which contains individual shape files 12. The host module 2 is also in communication with external data sources, such as a topographical data source 10 and a map image service 9. A mobile device 4 is in communication with the host module 2 and the map image service 9. The mobile device 4 includes an interface 300. The interface 300 displays soil shapes 14a and 14b, which correspond to one or more shape files 12.

A mobile device 4, as used herein, refers to a computing device with communication capabilities. Mobile devices 4 may include, for example, tablet and laptop computers, mobile phones, electronic devices specially designed for use with the system, or any other like computing device.

In one preferred and non-limiting embodiment of the present invention, the mobile device 4 may be provided with a mobility application that communicates with the host module 2. A "mobility application" is understood to be a computer program running on a mobile device and may include, for example, standalone applications, interactive webpages, or other types of computer programs and/or compiled program instructions. The map information displayed on the mobile device 4 may be a subset of map information provided by the map image service 9, a mapping host, or otherwise provided by the host module 2. The map image service 9 or the mapping host determines hosted map information from position coordinates supplied by the mobility application, or indirectly through the host module 2, and transmits a limited set of map information to the mobile device 4. The mobility application allows viewing of the map information on the mobile device.

The map information may include the visualization of topological information for a region, retrieved from a topographical data source 10 or other data source. The topological information may include, for example, features of interest (e.g., drinking water wells, animal nests, endangered species habitats, other crops, and the like) and buffer areas (i.e., setback distances) around these features. The buffer areas define regions around features of interest, a crop region, or other shapes and/or features within which the application of agricultural chemicals, the planting of genetically modified crops, or other activities, are to be avoided. Intersecting buffer areas provide suspect regions, which may also be visualized on the mobile device 4 through the mobility application.

The mobility application electronically reports coordinates, which may change as the position of the mobile device 4 changes. The map information data changes as the coordinates of the mobile device 4 change, such that the host module 2 transmits new map information data in response to the changes in coordinates. The coordinates may be reported in real-time. The mobility application may be used by field personnel, application monitors, or other users, to assist in detecting regions where the application of agricultural chemicals and genetically modified crops, as examples, are to be avoided. The detected regions may be transmitted to an applicator system or other entity.

In one preferred and non-limiting embodiment, the visual information system 1 shown in FIGS. 1a and 1b creates and/or processes mapping data (e.g., topographical data or other data) for transmission to the mobile device 4. For example, the host module 2 may calculate a subset of spatial data based upon an area, such as a crop or grove. The subset of spatial data is then overlaid on a map of the area. This combination of spatial data combined with a map provides the application monitor with a useful visualization of an area and allows the application monitor to view relevant information, such as drinking water wells, water sources, species, groves, crop regions, and/or soil regions in relation to the topographical features of the area. The visual information system 1 may use different methods to preprocess spatial files to find desired data. These techniques may be used to determine an area for which shape file 12 is needed.

With reference to FIGS. 1a and 1b, system 1 may be configured to create shape files 12 by converting spatial files that are received from an external data source, such as a topographical data source 10 (e.g., a Geographical Information Systems (GIS) server or other spatial files archives local or external to the system). For example, the Soil Survey Geographic (SSURGO) Database provides detailed soil geographic data about soil types in the United States, by county. However, these spatial files can be extensive. For example, in Polk County, Fla., the spatial files include approximately 27,000 files. In one preferred and non-limiting embodiment, the spatial files retrieved by the system 1 may be converted to Keyhole Markup Language (KML) files 6 using an Extensible Markup Language (XML) conversion module 3.

The XML conversion module 3 takes, as input, spatial data or other relevant data and creates and outputs XML-formatted data and, specifically, KML data. KML files 6 are used to specify a set of features, such as place marks, images, polygons, 3D models, or textual descriptions for display in Google Earth, a mobility application, or any other 3D Earth browser (e.g., geobrowser) implementing KML encoding. Each entry has a longitude and latitude, and data to make the view more specific such as, for example, tilt, heading, and altitude, which together define a "camera view". The KML data 6 may represent spatial files converted to latitude and longitude coordinates. KML files 6 are then separated into individual shape files 12.

With continued reference to FIGS. 1a and 1b, the KML files 6 are formed into shape files 12 by the shape determination module 5, which may then be stored in a shape files database 11. The shape determination module 5 accepts, as input, one or more KML files 6 and outputs, to the host module 2, shape file database 11, or directly to the mobile computer 4, shape files. From the shape files database 11 or shape determination module 5, individual shape files 12 are created. A shape file 12 is information about one individual shape on the map. Shape files 12 may be latitude and longitude based. For example, one shape file 12 may describe a shaped polygon of soil 14a within coordinates on a map 13 representing the shape of a particular soil type within a number of other soil types for a particular area of interest. The data includes information describing the geological structure of the area. These individual shape files 12 may be dynamically chosen by specifying the maximum distance to a latitude/longitude point, as discussed below. In one embodiment, the mobility application on the mobile computer 4 can process the subsets of data and display the data on mobile devices 4 carried by field application monitors.

The shape files 12 may include information regarding soil types and may be designated as "vulnerable" when the soil is considered a type through which crop protection chemicals can more easily travel or permeate. In one embodiment, any soil, or group of soils, may be marked as vulnerable or given another identifier to distinguish such soils from other soils.

The shape files database 11 may be queried by the host module 2 for particular shape files 12 defining objects within an area. Only a small subset of shape files 12 will then be provided to the mobile computer 4 based on the designated area. For example, if an application monitor is checking chemical treatment in a particular grove, the host module 2 may provide only data within a specific radius of the grove. In one embodiment, this radius may be defined based on the geographical center of the grove. The host module 2 may then determine the objects within the designated radius of the selected area and only send those shape files 12 defining those objects. This subset of information may be part of a county map, multiple county maps, one block of a county map, or only data within the active range of the application monitor. The end result is a subset of a larger set of map data that shows only the area of interest. The amount of data needed can be thus filtered down to a range of 100 kb-100 mb of data, as an example.

With continuing reference to FIGS. 1a and 1b, in addition to individual shape files 12, the host module 2 may have access to other information, stored in a database 15 or some other form of data structure, for the visual information system 1. For example, state and session information useful for field personnel (such as application monitors) may be stored in a database 15. Examples of such information may include soil type data, soil shape data, well data, grove data, and monitor data.

Referring now to FIG. 8, shown is an example soil type table that may be stored in a database 15 and made accessible to the host module 2 (not shown) according to one preferred and non-limiting embodiment of the present invention. The information in FIG. 8 is regarding Hillsborough County. The soil numbers are specific to the county and are used by the system as a cross-reference to determine soil names. For example, when the host module 2 is using a particular shape file 12, the system may use the soil type table to look-up an identifier for a certain soil type.

With reference to FIG. 9, shown is a table of data representing an individual shape according to one preferred and non-limiting embodiment of the present invention. As represented by the data in FIG. 9, a shape file may include many points that are used to form a particular shape. FIG. 10 depicts a table of data representing ground water wells stored in the system. FIG. 11 depicts a table of data representing crops (e.g., groves) where a farmer or applicator is ready to apply an agricultural chemical, i.e., crops that are ready to be monitored by the system. FIG. 12 depicts a table of application monitor data representative of data collected by an application monitor while in the field. It will be appreciated that many different types of data, stored in a variety of different data structures, may be utilized.

During operation, the host module 2 enters a session with an application monitor's mobile computer 4. The session includes messages such as, for example, HTTP requests and responses in back and forth communication during a session. In addition, asynchronously to the session, updates are continuously sent from the application monitor's mobile computer 4 to the host module 2 and are stored in a database 15. Updates transmitted to the visual information system 1 define the actions taken by the application monitor on the mobile computer 4. The updates can be used to reproduce a session or for auditing an application monitor's crop survey.

In one embodiment, to facilitate login, the mobile computer 4 may provide a login screen having a list of the names of approved application monitors that may be selected to authenticate an authorized user. Once the application monitor is authenticated, a crop may be selected to observe. The application monitor may then survey the crop using the mobile computer 4. For example, as the application monitor moves about a grove, the location of the mobile device 4 is tracked by a GPS sensor in the computer 4 that is in communication with a GPS satellite 8. The visual information system 1 synchronizes the GPS location of the application monitor every several seconds, or at other predetermined intervals.

The visual information system 1 may be used by an application monitor to determine where the application of agricultural chemicals should be allowed and where the application should be avoided. A system of buffers, or "setbacks", facilitates finding these restricted areas. In one embodiment for citrus groves, a buffer is determined and is rendered around the grove by using shape files 12. The host module 2 calculates points forming a buffer surrounding the grove. Each point in the buffer is calculated to be 300 ft. from a point in the grove and the buffer defines an outer polygon representing 300 ft. from the inner polygon representing the grove. An application monitor can use this representation to narrow their focus to points in the restricted zone. If application monitors find a feature of interest, such as a ground water well, within the buffer zone, they can alter the application of agricultural chemicals to avoid that feature. It is to be understood that the invention could use any buffer size.

Additionally, the host module 2 may provide a variable buffer having a variable setback distance. For example, the system can calculate the wind speed (using a wind speed sensor) and provide the information to dynamically morph the buffer polygon to ensure that the agricultural chemicals are kept at the correct distance from a particular feature. A buffer may be used around any desired object in the system. Finding any intersecting grove buffers and well buffers, farmers and applicators are provided with areas where the agricultural chemicals, genetically modified crops, or other activities, should not be applied. Using the visual information system 1, map and geologic data can be displayed simultaneously and in real-time.

In another non-limiting embodiment of the present invention, buffers are used to determine the correct distance from wildlife habitats that restricts the areas to which agricultural chemicals can be applied. This functionality may use government or other databases to identify habitats of threatened or endangered species in relation to the land used for crops. In one non-limiting embodiment of the present invention, the visual information system may be used by an application monitor to determine where the planting of genetically modified crops should be allowed and where such crops should be avoided.

The visual information system 1 provides a workflow, such as showing prior visited locations of a particular application monitor. The system 1 may provide information regarding which application monitors are authenticated (authorized) to access the visual information system and can show their previous activity in the field. In this way, managers can view the progress for specific crops or application monitors, and mobile computers 4 can be used to add information in the field for the application monitors to view. This workflow helps setting up certain groundwater well constructions, and other features, which require setback distances.

Initially, a setback distance may not exist for groundwater wells in the system. The application monitor may be enabled to input information about the well into the system. In some embodiments, the system may be programmed to use a default setback for groundwater wells, or other features, that are not already associated with setback distances. Pictures of the well or any landmark surveyed or observed may be included in the input information. A manager can view the pictures to provide feedback either into the system or directly to an application monitor at a location, such as to determine if a particular groundwater well qualifies for a lesser (i.e., shorter) setback. The visual information system 1 can provide mobile computers 4 with supervisory and validation capability. The storage of movements and actions in the system provides audit capability as to who changed information in the system and when. The visual information system 1 may also be configured to calculate how many bushels per acre a certain crop will produce, using various types of soil data and other relevant data. This information can be used to determine what an estimated cost associated with not using a particular product application on the area would be.

With continued reference to FIGS. 1*a* and 1*b*, the mobile computer 4 captures movement data. As movement of the mobile computer 4 occurs, updates of positions are sent to the host module 2 and are stored in the database 15. The GPS location of the application monitor's computer 4 can be provided every several seconds. It is to be understood that any time interval can be used in order to provide information to the host module 2. In one embodiment, this movement information may be stored and used to recreate a session.

Figure 3A:
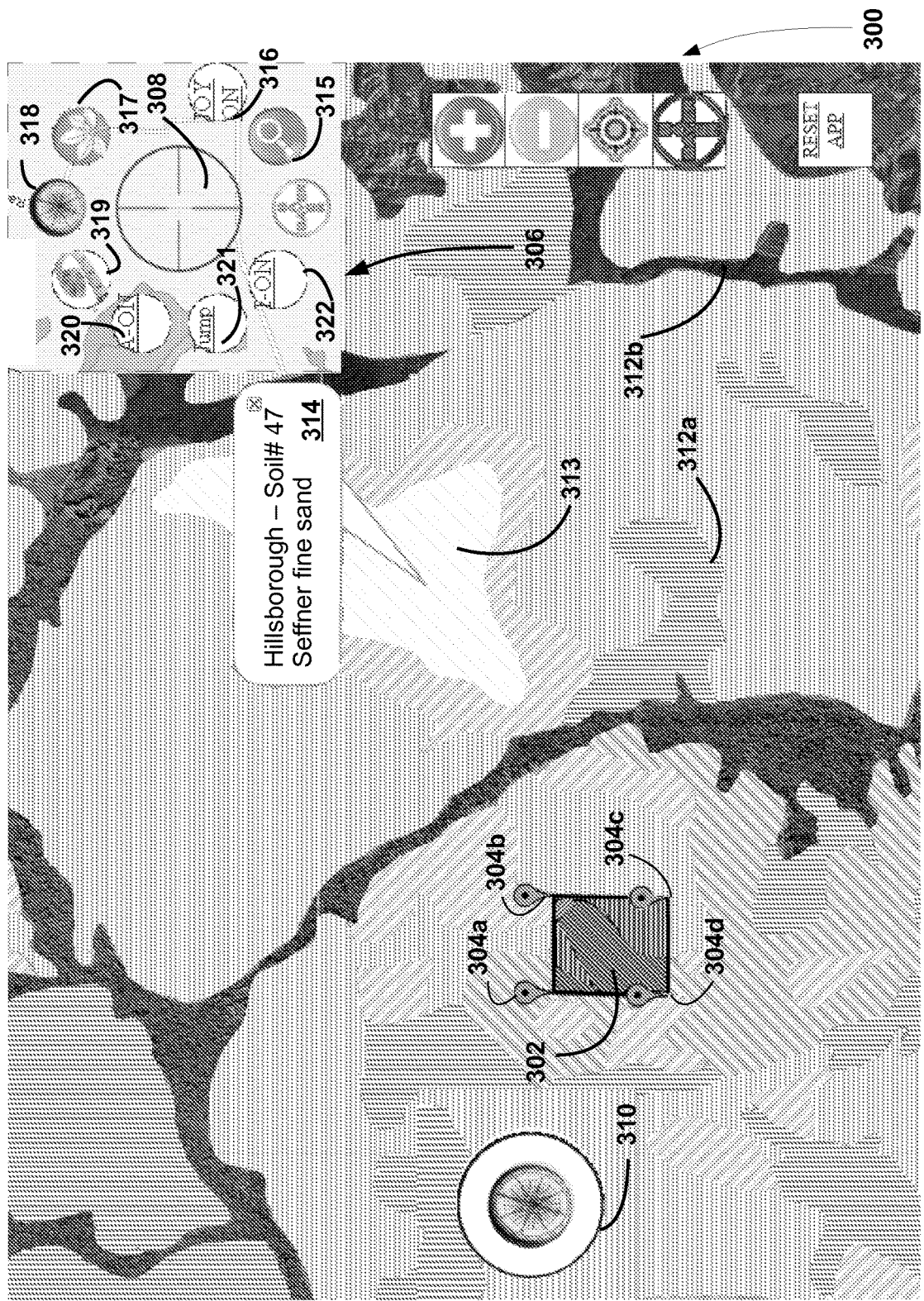
FIG. 3a is a view of a mobile computer interface providing topographical views of soils rendered from data of the visual information mapping system according to principles of the present invention.

Referring now to FIG. 3*a*, a mobile computer interface 300 of the visual information system is shown according to one preferred and non-limiting embodiment. The interface 300 may be used to observe a crop. On the interface 300, a map shows an area of land and various soil shapes. The system 1 also can provide a hybrid map having the mapping information shown in FIG. 3*a* mixed with satellite imagery. In this example, the visual information system is used for the survey of groves. A grove 302 is delineated by a set of tags 304*a*-304*d*. A grove can have any number of tags outlining the polygon forming the grove. It will be appreciated that any type of crop area or other region may be delineated by a set of tags in the context of the system.

With continued reference to FIG. 3*a*, shown is a particular area and grove region. The visual information system 1 provides the application monitor with a graphical view of soil types surrounding the water wells or other features and/or regions. The map layer of the mobile computer interface 300 shows the soil types, represented by different shades or other visual indications. In one non-limiting embodiment, the mobile computer interface 300 provides functions to tag a soil shape with a name and identity, and store the soil data in a database 15 in communication with the host module 2.

With continuing reference to FIG. 3*a*, the mobile computer interface 300 may include a movable, customizable menu 306 having a set of icons surrounding a scope 308. The menu 306 shown is a context menu. The menu 306 provides application monitors the capabilities they need to enable proper chemical applications, and also maximizes effective space on the mobile computer interface 300 to show maps and information about crops. In a preferred and non-limiting embodiment, the menu 306 may be moved around the map either manually or automatically. The scope 308 may focus on specified areas in the map. When the mobile computer moves the scope 308, sub-menus may move with it. The menu 306 and scope 308 may also move automatically in response to the movement of the mobile computer and the application monitor in the field. As the mobile computer 4 moves, the location of the mobile computer is tracked by a GPS sensor in the device and the viewable area and map automatically update to correspond to the movement of the mobile computer 4.

The interface 300 may display various types of data to a user of the mobile device 4 such as soil and land condition data. Such data may include, for example, pH balance, texture, density, slope, composition, salinity, and the like. This data may be obtained from numerous databases, external or internal to the system 1 that may be local, national or global in scale. One such database is the Harmonized World Soil Database, which provides a global resource for soil information indexed by longitude and latitude coordinates. The mobile device 4 may display a topographical view of soil information retrieved from such databases, such that the information is mapped out according to location and indexed through a graphical user interface.

One type of setback is an area surrounding a water well. A drinking water well can be indicated on the map using various visual techniques, such as different colors, highlights, shades, pinpoints, or cross hatches, and is associated with a particular setback distance range. The mobile computer interface 300 may have a highlighted area indicating the water wells in a plan of the area. The well information may be stored as shape files 12 and may be used in later surveys of an area. Water well depth from past surveys may be used to formulate a setback distance based on the depth of the well.

Each icon of the menu 306 may be programmed to perform a particular function. The menu 306 may also be programmed to include a hierarchical set of menus, each level having a set of icons corresponding to various functions such as, for example, a "best crop" function. As an example, icon 315 may provide a search window or function. Icon 316 is a joystick on/off button to provide a joystick window for moving objects. The joystick can be operable to move a scope. The joystick can provide the application monitor flexibility in order to fine tune the coordinates on the map. The joystick moves the scope and then converts the scope x and y screen location to latitude and longitude based on a zoom level of the map. The visual information system 1 can use the outer bounds of the map and the zoom level. The zoom level can be determined from map data.

Icon 317 may provide access to a crop sub-menu that provides functions relating to a crop, such as a grove. The crop sub-menu may provide users icons having the functionality to add pins, wells, houses, and other points of interest, as examples. A point of interest may define a point that needs to have further investigation for any reason. A pin may be plotted on the map for indicating that the application monitor should further review this area. A pin represents a coordinate, having a specific latitude and longitude. The grove menu may also provide document management for the groves. The managed documents are associated with particular groves, and may provide access to documents with specific information, such as product applications, pictures, and checklists.

Figure 3B:
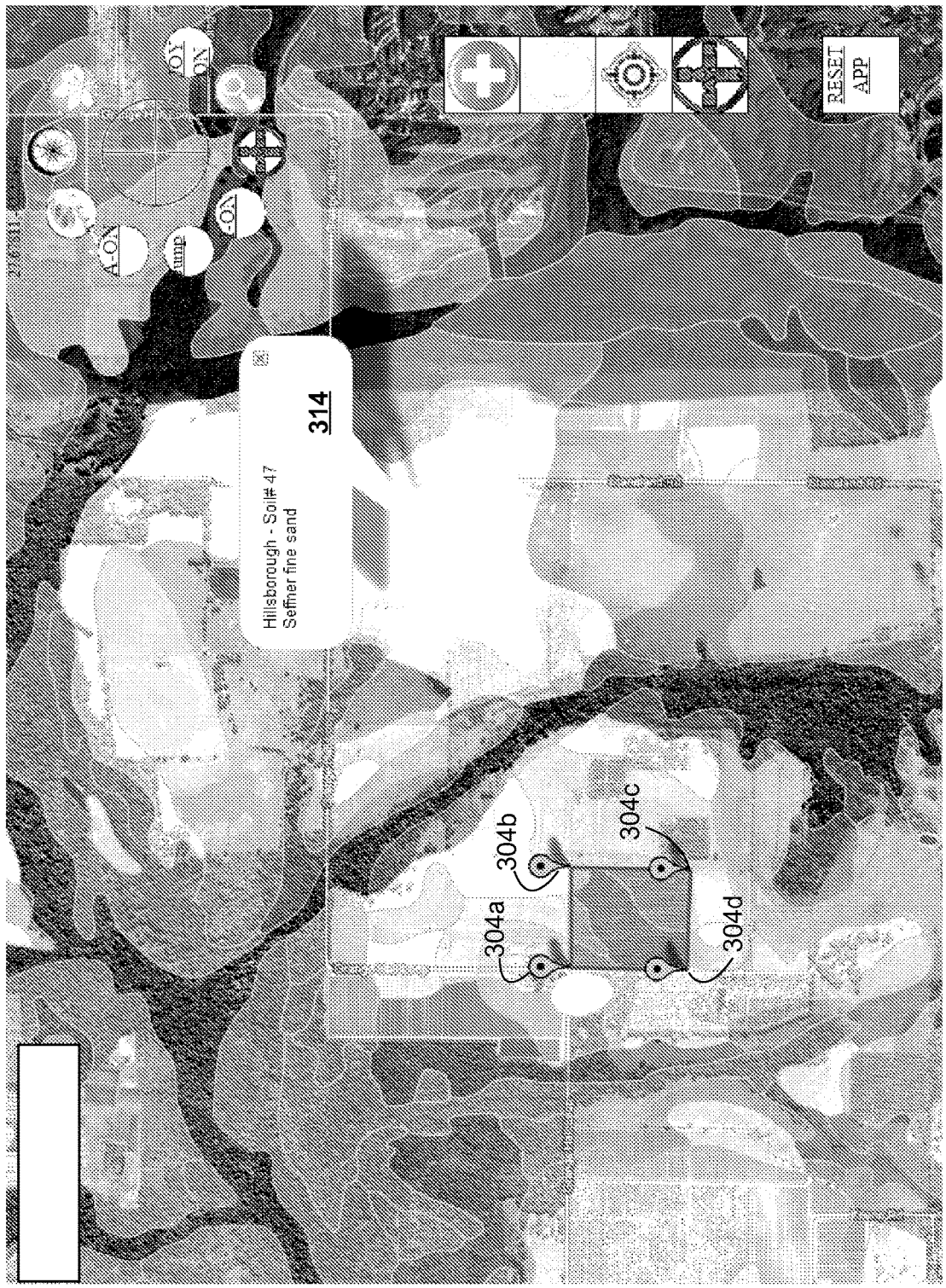
FIG. 3b is a view of a mobile computer interface providing topographical views of soils rendered from data of the visual information system, such that soil information is seen superimposed on top of land information, according to the principles of the present invention.

The crop sub-menu may further provide functions to visually display soil information using a switch or other means to turn soil information on and off. With reference to FIG. 3b, the soil information of FIG. 3a is shown superimposed on corresponding land information including, for example, satellite imagery, road maps, and various topographical features. Crop (i.e., grove) information is also shown. Soils and vulnerable soils may be displayed, and an information pop-up window may show all the information that the system stores about a soil shape. The crop sub-menu may also provide a function to display a buffer zone and the area of the buffer as calculated in the system. In addition, the crop acreage can be displayed.

With continued reference to FIGS. 3a and 3b, icon 318 provides a mapping function sub-menu. The mapping sub-menu may provide a zoom function to zoom-in or zoom-out to the center of the current scope location. In addition, the visual information system offers a crop zoom function, which zooms to the center of the selected grove or crop. The visual information system may further provide a zoom for focusing on the current location of the mobile computer 4, although tracking may be required to be on in order to use this zoom function. The map sub-menu also shows a selection of map types. For example, different map types, such as hybrid or road maps, may be made available. A function may also be provided to center the crops on the interface 300. A tracking function may provide the position of the mobile computer 4 in relation to the current map view. In tracking mode, as the device 4 moves around, a visual representation, such as a dot, may be displayed on the mobile computer interface 300 and move on the map in correspondence to the movement of the device 4 within the crop region. An application monitor can use this function to follow their path on the displayed map in relation to their surroundings.

Icon 319 may provide a measurement menu to add points to the map data and to modify the same. The measurement menu may also show driving directions to a point, with the system defaulting to a current location in the grove. A function for distance measuring provides a distance from point 'A' to point 'B'. The points may be plotted on the map with the joystick to determine or visually indicate how far apart they actually are. The menu may also provide a crop designer mode to provide a reset of crop points to start a new crop location from scratch. This functionality may be used when an application monitor finds additional crops in an area and needs to create a crop location as they are surveying.

The menu 306 may further include icon 320 for an address on/off function. The address on/off function may find the nearest house, residence, or other location, to a particular point indicated with an input device, such as a mouse or touchscreen, and display on the map the exact location of the address. Icon 321 may provide functions to "jump" to (i.e., go directly to) an input address. Icon 322 is an information on/off function for displaying information from point-to-point on a map of the visual information system 1.

A number of different soil types are represented in FIG. 3a by the shaded shapes rendered on the interface 300. For example, soil shape 312a is shown having a shade unique to that particular shape and can be distinguished from soil shape 312b, which is provided with a completely different shade. The types of soil are represented by different colors, different shades of grey, or different patterns. However, one skilled in the art will recognize that other patterns, methods, or representations could be used to indicate different types of soil. The scope 308 may be used to highlight different soils and activate a soil information pop-up window 314 corresponding to a particular soil shape 313. As shown, soil 313 is of the type Hillsborough with the description "Soil #47 Seffner fine sand."

Figure 4:
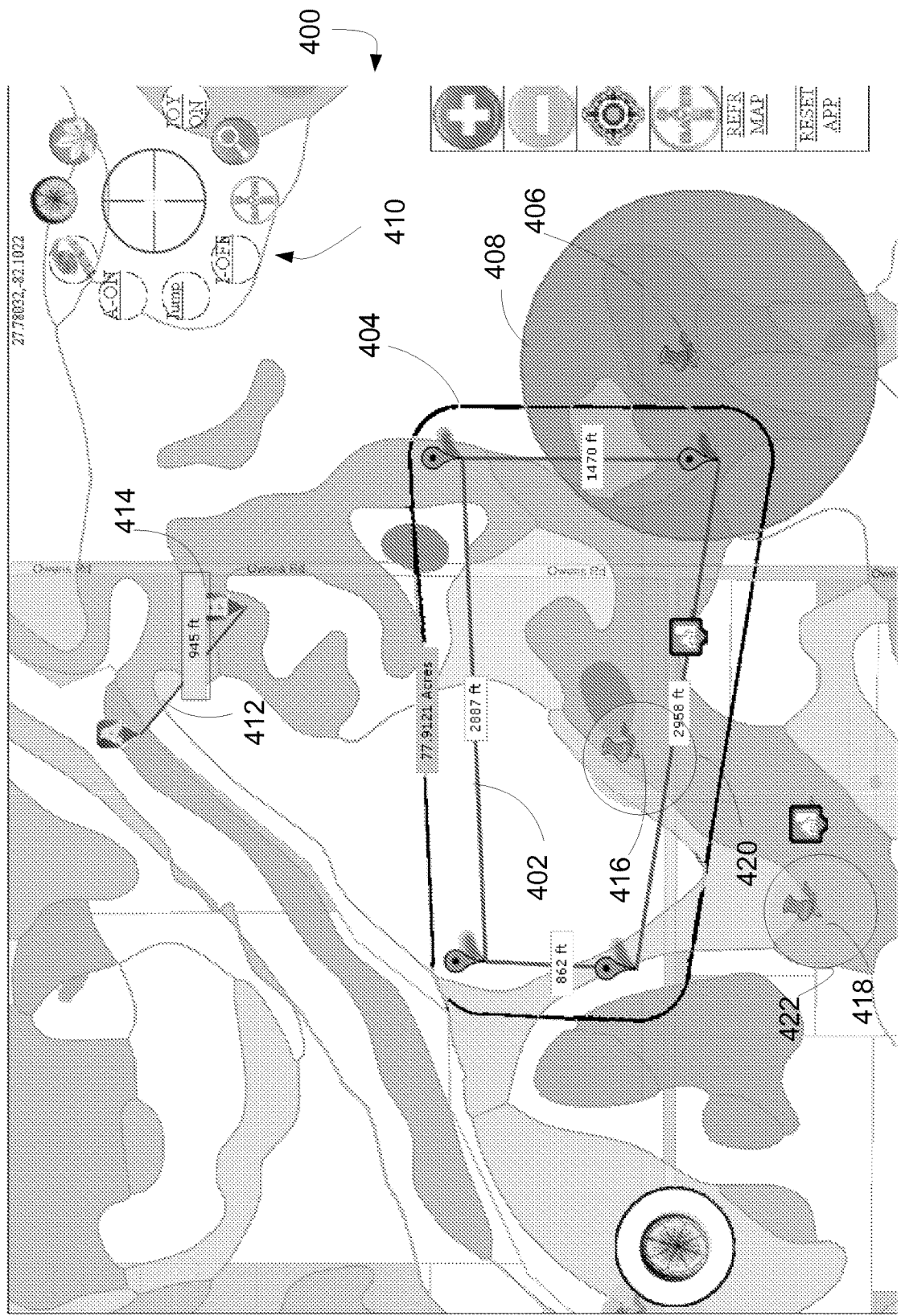
FIG. 4 is a view of a mobile computer interface providing topographical views in and around a crop surrounded by a buffer area of the visual information mapping system according to the principles of the present invention.

With reference to FIG. 4, a mobile computer interface 400 displays a visual map including a crop region (e.g., grove region) 402. The crop region 402 is shown surrounded by a buffer (e.g. setback) 404. In addition, a point marking a well 406 is shown. The well 406 has a setback region 408 surrounding it. A menu 410 is also displayed on this screen, having functions as discussed above. In addition, with continued reference to FIG. 4, a line segment 412 formed from points A to B can be used to measure the distance from point A to point B. In this example, the line segment 412 has a distance of 945 feet, as shown in the distance box 414. Finally, groundwater wells 416 and 418 are shown, each having respective setback regions 420 and 422. In one embodiment, the setback distance can be adjusted based on the soil type or other specific objects in the area.

Figure 5:
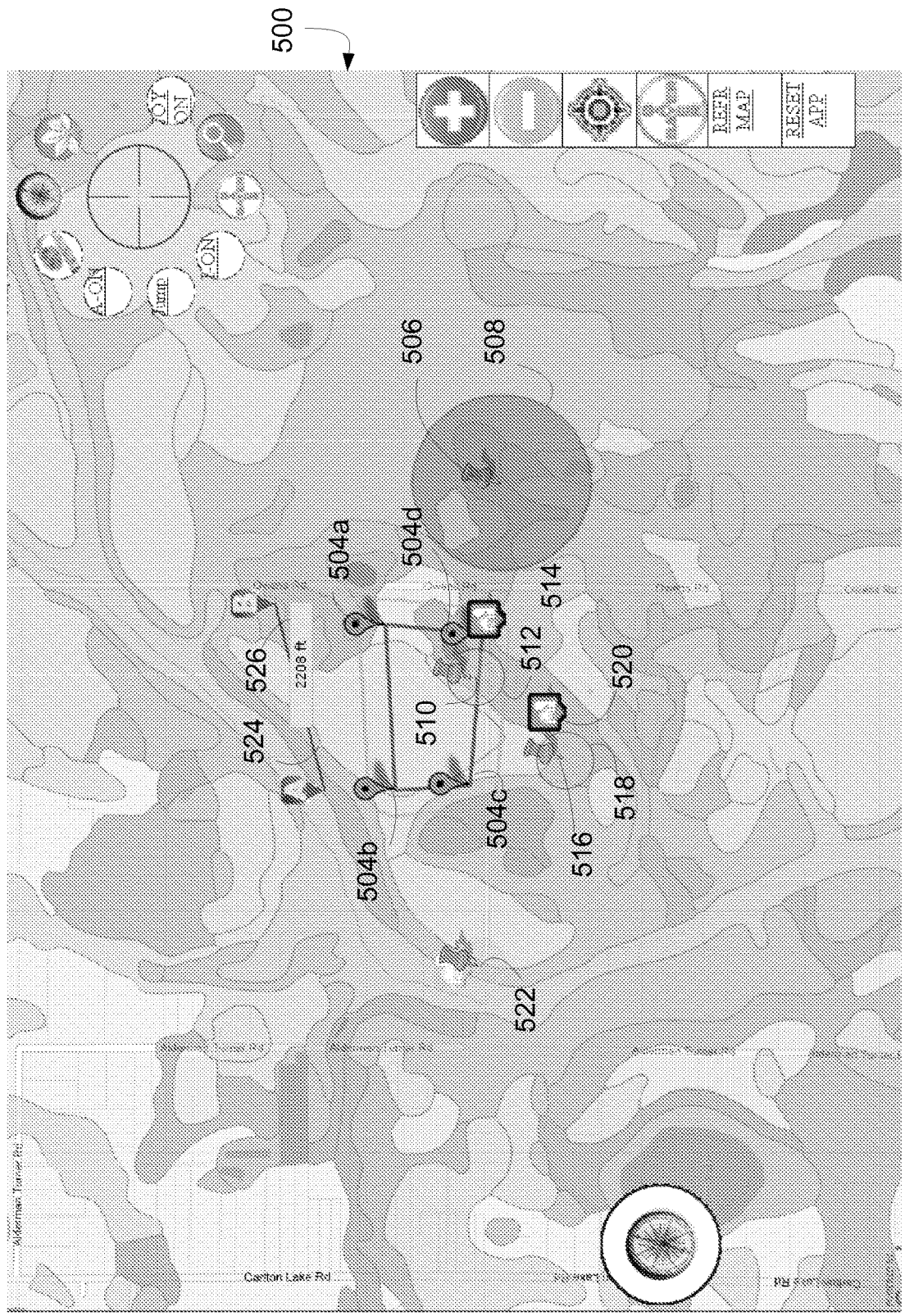
FIG. 5 is a view of a mobile computer interface providing topographical views of soils rendered from data of the visual information mapping system having a crop represented by pins according to the principles of the present invention.

With reference to FIG. 5, a mobile computer interface 500 having a crop region 502 is shown according to one preferred and non-limiting embodiment of the present invention. The crop region 502 is formed of points as represented by location pins 504a-504d. The location pins 504a-504d provide a specific latitude and longitude. An example of a groundwater well 506 is seen outside the crop region 502 formed from location pins 504a-504d having a setback buffer region 508 of 1000 ft. In addition, a groundwater well 510 is shown having a setback 512 of 100 feet. The groundwater well 510 appears to belong to the house 514. The groundwater well 516, having a setback buffer 518 of 100 ft., appears to belong to the adjacent house 520. The well 522 does not appear to be adjacent to a house or be associated with a setback buffer. The line 524, formed of point A to point B, has a distance of 2,208 feet, as shown in the distance box 526.

The application monitor reviews the areas where the buffer areas of the groundwater wells intersect the buffer area of the grove. This is an area where application of agricultural products may be controlled. To control application, the application monitor can identify points by using flags where the application should stop. The flags will indicate to the farmer or applicator that treatment should stop when this area is reached. In addition, the automatic application of agricultural chemicals and other treatments can be controlled using positioning coordinates provided directly to automatic applicator equipment.

The present invention also includes a method of using the visual information system. A mobile computer is provided having a splash (e.g., introduction) screen showing information and a login activation section. The login section may provide selectable application monitor names or a text box for authenticating a user. In one preferred and non-limiting embodiment, the splash screen may also provide driving directions from a current location or specified address to a selected crop region. Once authenticated, a crop region is either created or opened. In crop designer mode, the user can create a new crop region by plotting the points of the crop they are surveying. For example, an application monitor could walk around the parameter of a grove and use the visual information system 1 to send points from the mobile computer 4 to the host module 2. In addition, points can be configured directly from the screen, such as using the joystick to move the scope 308, or positioning the scope by selecting the inside of a polygon in the mobile computer interface 300 of the mobile application.

Alternatively, the application monitor could open a previously stored crop region. When a crop region is selected, the soil shape files 12 are transmitted to the application monitor's mobile computer 4 from the host module 2. The shape files 12 are displayed for a particular distance (e.g., 3 mile radius) around the selected crop region. If there is a disruption, the visual information system may refresh the map automatically. It is to be understood that distances provided for setbacks, buffers, and active areas are characteristics of certain embodiments and may be configured to address different locations, crops, soils, or other features relating to land.

In one preferred and non-limiting embodiment, the visual information system 1 may provide an edit mode. In edit mode, the user may be enabled to tag objects in the display which they find during their survey. For example, groves, wells, or other features relating to the land, may be indicated by pins. The visual system 1 may include an information window, which has information about a grove. If that information is found to be incorrect, the system allows the user to edit the information.

When in edit mode, the menus and scope may be freely moved by using a touch screen, or other input device, to drag and drop. The screen may be placed in locked mode and the joy stick may be used to move pins without touching the screen. After the application monitor has entered all of the crop information, and the user exits the edit mode, the user may be prompted to save the information to a database 15 in communication with the host module 2.

As the application monitor surveys the crop region, the visual information system 1 may provide a checklist menu to list items the application monitor should survey, such as possible groundwater wells near the area of the crop region's buffer.

The visual information system may be used to check and color code houses in the area. House information may be mapped based on a tax records database, for example. The system may use external information or data sources, such as Google, to display houses or other related information automatically.

With reference to FIG. 4, the application monitor may observe the area defined by a buffer 404 surrounding a crop region 402. The crop buffer has rounded corners to show the actual buffer distance relative to the corners of the crop region 402. A buffer toggle menu may be used to select a buffer distance. The default buffer can be 1000 ft. However, it should be understood that any desired distance could be used. For example, 1000 feet can be used, in addition to 100 to 300 feet, to provide the mobile computer 4 the capability to toggle between each of these buffers. In addition, any number of buffers may be used in a designated area.

As the application monitor identifies groundwater wells (such as well 416), the mobile computer 4 may be used to configure location pins about the groundwater wells and provide information about the wells. In one embodiment, the wells may be visually color coded. For example, red may indicate a non-compliant well, and green may indicate a compliant well. A yellow well may indicate that the well parameters are unknown (an unknown well may be given a default setback). Buffer distances can be automatically defined to correspond to compliant and non-compliant wells. Alternatively, the user can set the buffer distance. It will be appreciated that any number of methods for indicating or differentiating between wells, or other features, may be used.

In addition to the previously discussed wells, other types of wells may be used in the system, including, but not limited to, irrigation wells. Different wells may be indicated using different colors/shades or other types of visual representations. The system can indicate waiver wells (i.e., wells with a non-drinking waiver on file) by using different color markers or other visual indicators. In addition to drinking water wells, other objects to be avoided may be indicated, such as the location of animal or insect nests.

Sometimes, when a survey is conducted, areas of interest are inaccessible. For example, if a house appears to have a well but the area is closed off, the application monitor will not be able to enter the area to perform a survey. However, if the application monitor sees a point of interest on the map provided by the visual information system and is unable to access the point, they may use the system to show the distance between any two points, or a current location and a point. In addition, the user can see the directional bearing between any two points, or a current location and a point. This functionality provides the application monitor the ability to see the direction of points on the map. In addition, if the user would like to reference another point on the map, the application may provide a "jump" function, such as that provided by icon 321 on FIG. 3a, where the user may type an address and, in response, the application will jump to the area corresponding to that address.

As the application monitor surveys the crop region, information gathered may be associated with that particular crop region. In addition, documents may be associated with a particular crop region prior to the arrival of the application monitor. For example, a material safety danger list, which tells the requirements for a chemical, can be entered into the system with the creation of the grove before the application monitor begins the survey. This information is accessible via the mobile computer 4 to the application monitor in the field, should any questions arise as to a particular safety requirement.

The application monitor may use the mobile computer 4 to find product restricted areas. If needed, the application monitor may maximize the screen and follow the setback buffer to place (e.g., tie or otherwise fix) location markers on the ground following the line of the setback so that the applicator or farmer can see where the product application should be stopped. As the markers are placed on the ground, the location coordinates (latitude and longitude) can be sent to the applicator. A tie button may be provided on the interface to enable a user to provide different tie types and transmit a coordinate for each tie location to the host module 2, or some other system. The system 1 can be used to show the bearing between any two points, or current location and a point. This is in order to see the direction of the points.

The visual information system can display, on mobile devices 4, a status for each crop region in the system, such as "completed", "ready", or "problem". This may indicate that the system has not been updated or is not finished for that particular crop region. Information, such as URL encoded information, may be sent via an e-mail having information regarding the current location. A crop monitor button can be configured to e-mail a manager any information.

In a further non-limiting embodiment, a method for recovering an application monitor's session is provided. The system 1 can provide session continuance where, in the case of terminal error on the mobile computer 4 or loss of connection, the session is able to be recovered. The mobile computer 4 sends status information to the host module 2. This information is retained by the host module 2, or other part of the system 1, as the information is captured. The status can be reconstructed from status information and sent back to the mobile computer 4 where it is used by the mobile computer 4 to retrace an application monitor's survey. A restart application button may be provided as an additional menu item.

Figure 6:
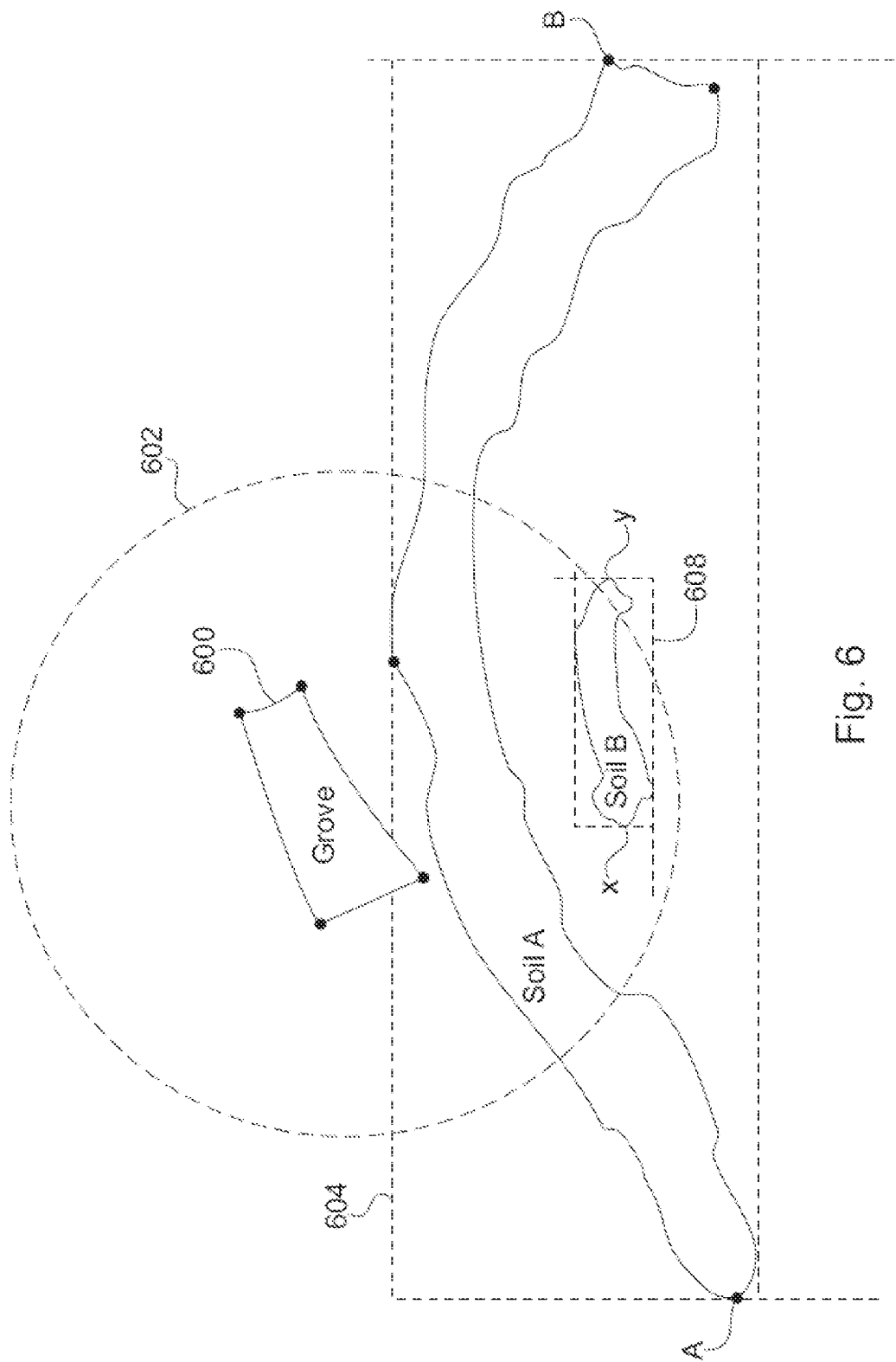
FIG. 6 is a diagram showing the calculation of displayable sets of soil mappings according to the principles of the present invention.

With reference to FIG. 6, a grove 600 having two adjacent soil regions, soil A and soil B, is shown. The soil A and soil B regions are rendered from shape files 12 (not shown). The shapes are made by using end points that describe a particular polygon or shape for a soil region. The shape files 12 may have numerous end points, and the end points may stretch over long distances. In order to limit the number of shape files 12 that are sent to an application monitor's mobile device 4 (not shown), the visual information system determines which shape files 12 are within a certain distance of the crop points. For example, by viewing the image, it is clear that soil A is near the grove 600 and that soil B is further away. Using a preselected threshold value, the system can find each of the furthest points of each soil shape or polygon, as compared to the grove point information, to determine if the soil should be used on the map. In this case, soil A has a furthest point A and a furthest point B, and soil B has a furthest point X and a furthest point Y. As can be seen in FIG. 6, if a threshold distance (represented by circle 602 having a radius) around the grove is used, the system 1 will use any polygon where one of the polygon's furthest points is within the threshold distance 602. As shown, point X is within the threshold distance of grove 600. Therefore, using the threshold technique, soil B would be included and soil A would not.

With continued reference to FIG. 6, a further non-limiting embodiment for determining what soil shape data to include, by calculating points using an active soil technique, will be described. In the active soil technique, the visual information system determines active soil shapes using polygons, represented by polygon 604 and polygon 608. These polygons are formulated using the outermost points of the shape data for a corresponding soil shape. As shown in FIG. 6, polygon 604 around soil A intersects the grove 600, and therefore soil A is determined to be an active soil. Because soil B is not intersecting the grove within polygon 608, soil B is not an active soil. In this example, only the active soils are sent from the host module 2 to the mobile computer 4 as previously discussed with reference to FIGS. 1a and 1b.

Figure 7:
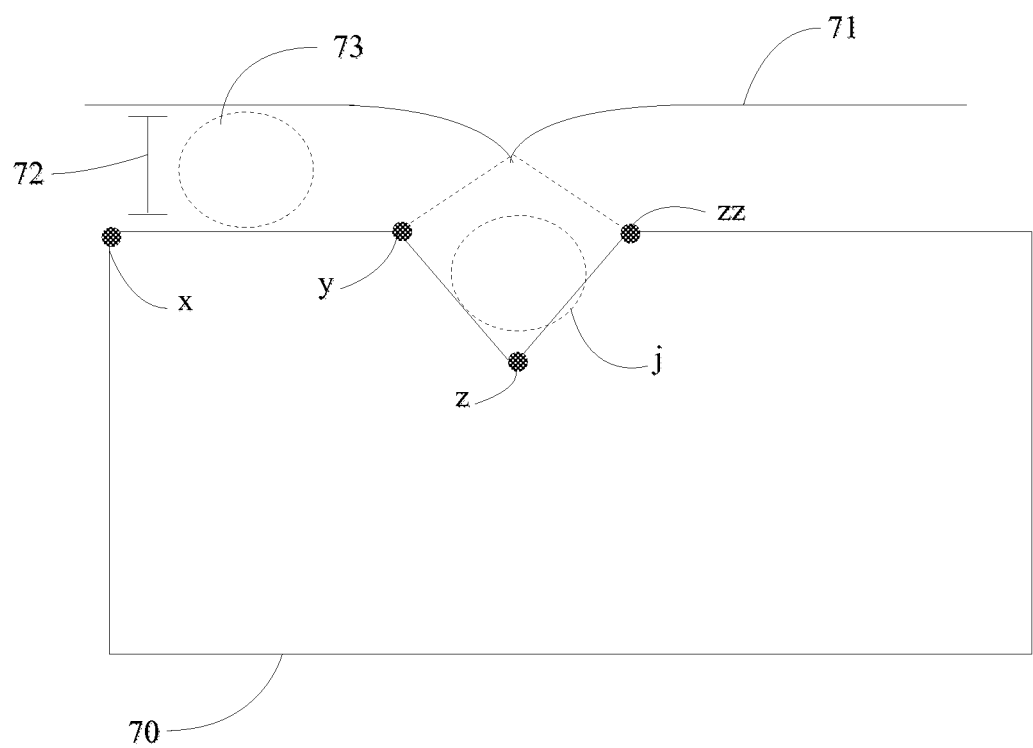
FIG. 7 illustrates a diagram for a method of calculating a buffer to be rendered about a shape polygon according to the principles of the present invention.

Referring now to FIG. 7, a method of calculating a buffer 71 to be rendered about a shape polygon 70 is shown. As described herein, the buffer 71 defines a boundary around the internal polygon 70. As shown, program instructions provide points at steps around the outside of the internal polygon 70. Points are at a specified distance from the polygon 70, where the distance is equal to the buffer setback distance 72. For conceptual purposes, a circle 73 is shown in FIG. 7 having a diameter equal to the buffer setback distance 72. For example, if the buffer setback distance 72 is 300 feet, the system would use a circle having a diameter of 300 feet. The system then steps along the outside edges of the shape polygon, marking the outermost points of the circle 73 at each step. For example, using a step of 10 feet, enough distance is provided between points to create an accurate buffer. The accuracy of the buffer 71 may be increased by decreasing the step to a smaller distance, for example, one foot. As the system steps along the edges of the lines formed from the corners of the polygon 70 (e.g., points x, y, z, zz), in this case a grove polygon 70, it stores the points in a data structure such as an array. The movement continues along the line until the system hits the last point necessary for creating the buffer 71. The system moves until it hits the next point. If no portion of the circle 73 falls within the internal polygon 70, the system keeps the point in the array and starts on the next line segment. Alternatively, when any portion of the circle (e.g., point j) falls within the grove polygon 70, the system determines it has moved too far in this direction and reverts back to the last point. Next, the system determines the bearing, and moves to the starting point in the next line segment that has a point that is not within the polygon.

In one non-limiting embodiment of the present invention, the mobile computer 4 is configured to provide, or retrieve from the host module 2, calculations relating to crop growth probabilities based on information drawn from publicly available soil databases (i.e., the Harmonized World Soil Database). Using this database, a mobile computer 4 may be configured to determine a user's GPS location, send the location to the host module 2, and receive information relating to the soil present in that area. The information may include, but is not limited to, a probable mix of the soil including pH, sand, silt, gravel, organic content, slope density, drainage, and other characteristics and matter. The host module 2, or the mobile computer 4 after receiving the requisite data, calculates the growth probability of a particular crop in that area based on the soil information. A forecast is then provided to the user on the mobile interface 300, showing how well a particular crop is expected to grow at that location.

In one non-limiting embodiment, the mobile computer 4, possibly through the mobile computer interface 300, provides a "best crop" function to determine, based on a plurality of databases and other information sources, the ideal crop or crops to grow in a particular area based on soil conditions and other data. This function allows farmers and others to make educated decisions regarding their yearly crop plots. This "best crop" function may consider data that includes, but is not limited to, soil type, including levels of nutrients and other compounds, as well as ground water data, drainage data, aridity data, expected weather conditions and historical data. An algorithm weighs the desired factors, along with other specified inputs, to provide advice to farmers. Data may be extracted from a variety of sources to formulate suggestions and/or advice.

As an example, the "best crop" function may use the Harmonized World Soil Database to retrieve soil information and determine a mix index. The mix index is a number that corresponds to the growth potential for one or more crops in an area. After the mix index is determined, other information, such as rainfall, temperature, humidity, heat index and other relevant data, are factored in to further narrow the list of crops with the best potential for growth. The final result of these calculations provides farmers with a list of crops that will grow in their specific area, with a percentage probability for success during the upcoming date ranges. For example, the results displayed to a user of the "best crop" function may specify that corn has a 92% chance of growing between September 15 and September 30, an 86% chance of growing between October 1 and October 15, and an 80% chance of growing between October 16 and October 30. Further functionalities of the "best crop" feature may include profitability determinations that, for example, consider current futures/commodities prices and local supply and demand data. Numerous other sets of data can be incorporated into the "best crop" function to enable farmers to maximize the profitability and use of their land. In an embodiment of this particular feature, the "best crop" determinations can be performed on any computing device having access to the required databases.

In a further, non-limiting embodiment of this invention, the mobile computer 4, possibly through the mobile computer interface 300, supports a global regulatory inspection function to confirm compliance with designated buffer zones. The global regulatory inspection function allows farmers, working with a government entity, to designate areas for genetically modified test crops. The function serves as a due-diligence and auditing tool, capturing location data, field area data, buffer area data, pictures, and other forms of data related to the surveyed field. Such functionality may be used for bioscience field surveys to eliminate the need for surveyors to carry multiple items/tools into the field in order to complete a survey of the area. The global regulatory inspection function collects data in order to confirm buffers used by farmers to designate areas for genetically modified crops. The global regulatory inspection function will allow surveyors to gather data and automatically generate reports once the area survey is complete, saving time and effort. This function ensures compliance with USDA buffer requirements and other regulations affecting agriculture by confirming locations of buffers and modified crops. This function can also help a farmer or surveyor prove that a sufficient buffer surrounds the crops and that, further, there is no danger of cross-pollination.

In another non-limiting embodiment of the present invention, the mobile computer 4 is configured to determine (or receive a determination from a remote computer) the impact genetically modified crops will have in terms of the amount of land used and expected yields. This functionality allows individuals to assess a large area and determine the extent of the impact that genetically modified crops will have on the land, such as the amount of land that the crop can be grown on compared to the amount of land that a comparable, unmodified crop can be grown on. For example, in many areas of the world, salinity levels in the soil significantly reduce the types and amounts of crops that may be grown. If a strain of rice is genetically modified to be more tolerant to saline soil, farmers may have to determine whether it is more profitable to grow the modified strain on a larger plot of land than an unmodified strain on the plots of land with lower salinity levels. By accessing information stored in databases regarding soil conditions, this function may analyze large areas of land to calculate the impact that genetically modified crops will have, and whether such crops will be more profitable based on the amount of land they can be grown on.

Figure 2:
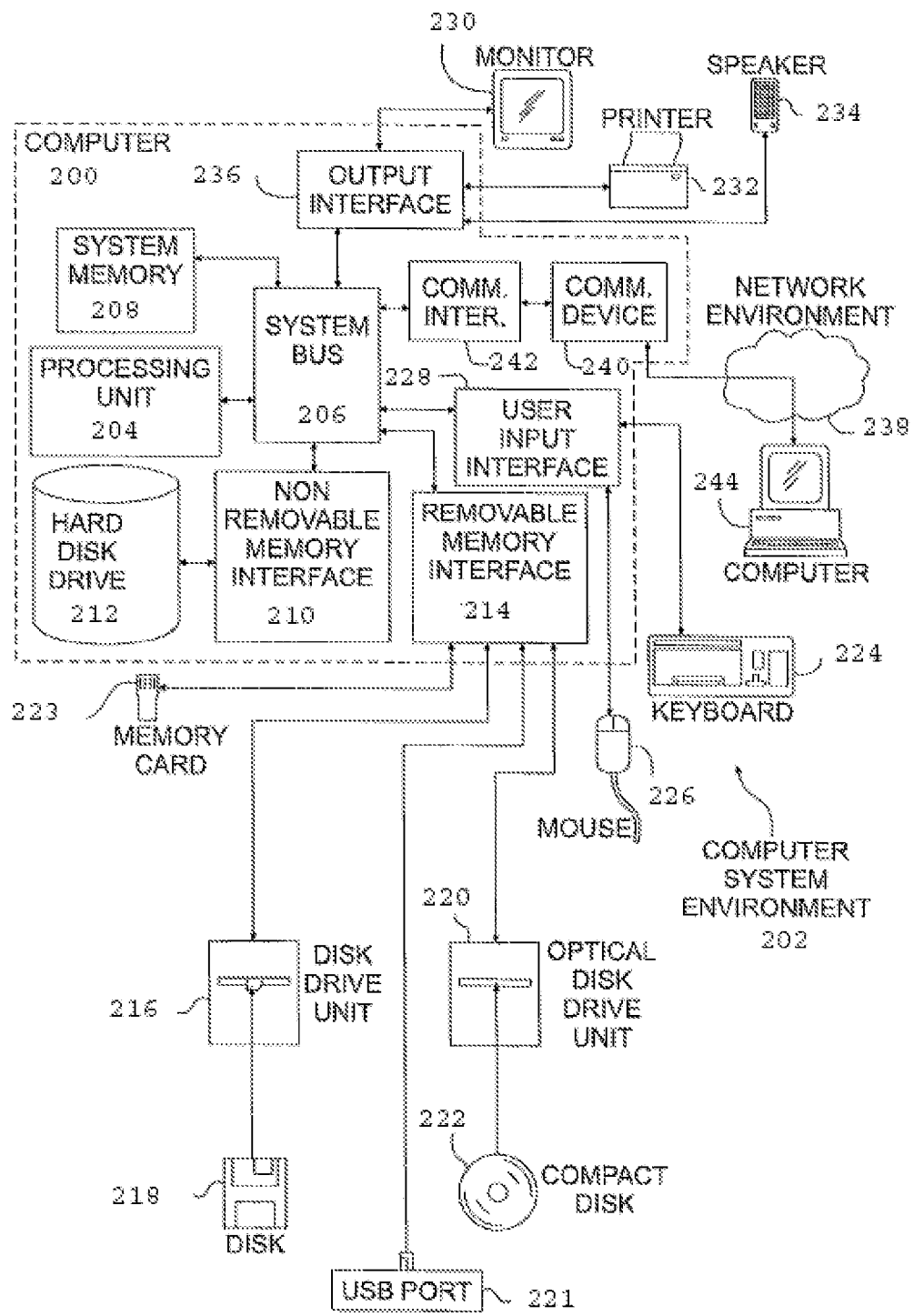
FIG. 2 is a diagram of computers used in exemplary computing systems of the present invention.

"Mobile computer" or "mobile device", as used herein, refers to the appropriate processing mechanisms and computer-readable media for storing and executing computer-readable instructions from the field, such as programming instructions, code and the like. As shown in FIG. 2, mobile computers 200, 244, in a computing system environment 202 are provided. This computing system environment 202 may include, but is not limited to, at least one computer 200 having certain components for appropriate operation, execution of code, and creation and communication of data. For example, the computer 200 includes a processing unit 204 (typically referred to as a central processing unit or CPU) that serves to execute computer-based instructions received in the appropriate data form and format. Further, this processing unit 204 may be in the form of multiple processors executing code in series, in parallel, or in any other manner for appropriate implementation of the computer-based instructions. In order to facilitate appropriate data communication and processing information between the various components of the computer 200, a system bus 206 is utilized.

The computer 200 may also include a variety of discrete computer-readable media components. For example, these computer-readable media components may include any media that can be accessed by the computer 200, such as volatile media, non-volatile media, removable media, non-removable media, etc. As a further example, the computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 200. Further, this computer-readable media may include communications media, such as computer-readable instructions, data structures, program modules, or other transport mechanisms and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media. The computer can be implemented as a compact mobile device and can include an antenna, such as implemented in any method or technology for mobile communication that can communicate with a mobile network interconnected with the host module 2 as seen in FIGS. 1a and 1b.

The computer 200 further includes a system memory 208 with computer storage media in the form of volatile and non-volatile memory, such as ROM and RAM.

With continued reference to FIG. 2, the computer 200 may also include other removable or non-removable, volatile or non-volatile computer storage media products. For example, the computer 200 may include a non-removable memory interface 210 that communicates with and controls a hard disk drive 212, i.e., a non-removable, non-volatile magnetic medium; and a removable, non-volatile memory interface 214 that communicates with and controls a magnetic disk drive unit 216 (which reads from and writes to a removable, non-volatile magnetic disk 218), an optical disk drive unit 220 (which reads from and writes to a removable, non-volatile optical disk 222, such as a CD ROM), a Universal Serial Bus (USB) port 221 for use in connection with a removable memory card, etc. However, it is envisioned that other removable or non-removable, volatile or non-volatile computer storage media can be used in the exemplary computing system environment 200, including, but not limited to, magnetic tape cassettes, DVDs, digital video tape, solid state RAM, solid state ROM, etc. These various removable or non-removable, volatile or non-volatile magnetic media are in communication with the processing unit 204 and other components of the computer 200 via the system bus 206. The drives and their associated computer storage media discussed above and illustrated in FIG. 2 provide storage of operating systems, computer-readable instructions, application programs, data structures, program modules, program data and other instruction-based computer-readable code for the computer 200 (whether duplicative or not of this information and data in the system memory 208).

A user (such as an application monitor) may enter commands, information, and data into the computer 200 through certain attachable or operable input devices, such as a keyboard 224, a mouse 226, etc., via a mobile computer input interface 228. Of course, a variety of such input devices may be utilized, e.g., a microphone, a trackball, a joystick, a touchpad, a touch-screen, a scanner, etc., including any arrangement that facilitates the input of data, and information to the computer 200 from an outside source. As discussed, these and other input devices are often connected to the processing unit 204 through the mobile computer input interface 228 coupled to the system bus 206, but may be connected by other interface and bus structures, such as a parallel port, game port, or a universal serial bus (USB). Still further, data and information can be presented or provided to a mobile computer in an intelligible form or format through certain output devices, such as a computer display system 230 (to visually display this information and data in electronic form), a printer 232 (to physically display this information and data in print form), a speaker 234 (to audibly present this information and data in audible form), etc. All of these devices are in communication with the computer 200 through an output interface 236 coupled to the system bus 206. It is envisioned that any such peripheral output devices be used to provide information and data to the mobile computer.

The computer 200 may operate in a network environment 238 through the use of a communications device 240, which is integral to the computer or remote therefrom. This communications device 240 is operable by and in communication to the other components of the computer 200 through a communications interface 242. Using such an arrangement, the computer 200 may connect with or otherwise communicate with one or more remote computers, such as a remote computer 244, which may be a personal computer, a server, a router, a network personal computer, a peer device, or other common network nodes, and typically includes many or all of the components described above in connection with the computer 200. Using appropriate communication devices 240, e.g., a modem, a network interface or adapter, etc., the computer 200 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 200, 244 may be used. Other services can be provided such as standalone or assisted global positioning system (GPS) operation using radio signals from satellites alone or preprocessed satellite signals. Assisted GPS additionally uses network resources to locate and utilize the satellites faster as well as better in poor signal conditions.

As used herein, the computer 200 includes or is operable to execute appropriate custom-designed or conventional software to perform and implement the processing steps of the method and system of the present invention, thereby, forming a specialized and particular computing system. Accordingly, the presently-invented method and system may include one or more computers 200 or similar computing devices having a computer-readable storage medium capable of storing computer-readable program code or instructions that cause the processing unit 202 to execute, configure or otherwise implement the methods, processes, and transformational data manipulations discussed hereinafter in connection with the present invention. Still further, the computer 200 as discussed previously can be a mobile computer 2 as shown in FIG. 2. The mobile computer can be in the form of an iPad, iPhone, a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for applying agricultural chemicals by providing visual crop data to a mobile device, the system comprising:
(i) an applicator system or automatic applicator equipment; and
(ii) at least one server computer having at least one shape determination module and in communication with a mobile device, the at least one server computer configured to:
receive, from the mobile device, location data relating to a geographical position of the mobile device;
retrieve, from at least one external topographical data source, topographical data associated with at least a portion of the location data;
furthermore, wherein the at least one topographical data source is at least one of the following:
the Harmonized World Soil Database, the Soil Survey Geographic (SSURGO) Database, or any combination thereof;
generate shape data in the form of at least one shape file based at least partially on the topographical data;
wherein at least a portion of the topographical data comprises Extensible Markup Language (XML) data, and wherein at least part of the XML data at least partially represents at least one of the following: mark, image, polygon, three-dimensional models, textual descriptions, geographical coordinates, or any combination thereof;
transmit at least a portion of the shape data in the form of at least one shape file to the mobile device, such that at least one shape is visually displayed on at least a portion of a map image displayed on the mobile device, wherein the at least one shape is based at least partially on the at least a portion of the shape data;
provide positioning coordinates to the applicator system or automatic applicator equipment; and
apply at least one agricultural chemical as indicated by the at least a portion of the shape data using the applicator system or automatic applicator equipment;
wherein the at least one shape file is generated by the at least one shape determination module; and,
wherein at least one of the at least one shape file is stored in a shape file database.

2. The system of claim 1, wherein the at least one shape at least partially indicates at least one region, the at least one region comprising at least one of the following: soil region, crop region, geographic region, or any combination thereof.

3. The system of claim 2, wherein at least one buffer region is displayed in relation to the at least one region.

4. The system of claim 3, wherein a location of the at least one buffer region in relation to the at least one soil region is at least partially determined by at least one of the following: regulatory requirements, water sources, crop type, crop treatment applications, or any combination thereof.

5. The system of claim 1, wherein at least one buffer region is displayed in relation to at least one of the following: protected area, water source, animal habitat, or any combination thereof.

6. The system of claim 3, wherein at least one of a size, shape, and location of the at least one buffer region is influenced by wind speed data, and wherein the wind speed data is retrieved from at least one of the mobile device and an external data source.

7. The system of claim 1, wherein the at least one server computer is further configured to:
receive field area data relating to the geographical position of the mobile device, wherein the field area data is received from at least one of the following: the mobile device, the at least one topographical data source, a local data source, a remote data source, or any combination thereof; and,
determine, based at least partially on regulatory data and the field area data, regulatory compliance data relating to at least one crop area, wherein the regulatory compliance data indicates whether the at least one crop area is in compliance with at least one regulation.

8. A system for applying agricultural chemicals comprising:
(i) a computer program product configured to provide instructions to an applicator system or automatic applicator equipment, and
(ii) an applicator system or automatic applicator equipment applying at least one agricultural chemical,
wherein the computer program product comprises at least one non-transitory computer-readable medium, the computer-readable medium comprising a program which, when executed by a device having a processor, at least one shape determination module, and at least one display unit, causes the device to:
transmit location data to at least one host, the location data representing a geographic location;
receive from an external topographical data source shape data in the form of at least one shape file representing at least one shape, the at least one shape at least partially corresponding to at least one specific region, wherein at least a portion of the at least one region is included in at least a portion of a geographic region;
generate the shape data in the form of at least one shape file;
display, in combination with a visual representation of at least a portion of the geographic region active within the at least one display unit, at least a portion of the at least one shape;
provide positioning coordinates to the applicator system or automatic applicator equipment;
applying at least one agricultural chemical to the at least a portion of the at least one region;
wherein the at least one shape file is generated by the at least one shape determination module;
wherein at least one of the at least one shape file is stored in a shape file database.

9. The system of claim 8, wherein the device comprises a mobile computer, and wherein the geographic location is at least partially based on a physical location of the mobile computer.

10. The system of claim 8, wherein the program further causes the device to display at least one buffer region in relation to the at least one specific region.

11. The system of claim 10, wherein at least one of a location, size, and shape of the at least one buffer region is determined by at least one of the following: regulatory requirements, water sources, crop type, crop treatment applications, or any combination thereof.

12. The system of claim 8, wherein the at least one region comprises at least one soil region classified by at least one of the following: soil composition, crop type, mineral level, altitude, specified geometric_boundary, salinity, or any combination thereof.

13. The system of claim 8, wherein the program further causes the device to display at least one suggested crop type for at least a portion of the geographic region.

14. The system of claim 13, wherein the at least one selected crop type is at least partially determined from at least one of the following: a best crop database, the geographic location, a soil type or composition associated with at least a portion of the geographic region, rainfall data associated with at least a portion of the geographic region, temperature data associated with at least a portion of the geographic region, salinity levels associated with at least a portion of the geographic region, or any combination thereof.

15. The system of claim 8, wherein the program further causes the device to perform at least one of the following steps:
display regulatory compliance information for at least one crop area, wherein at least a portion of the regulatory compliance information is determined at least partially from field area data inputted into the device;
transmit compliance information related to at least one inspection region to at least one regulatory authority, wherein at least a portion of the compliance information comprises at least one of the following: an image or video of at least a portion of the at least one inspection region, inputted data, wind speed data, altitude data or any combination thereof;
generate a regulatory compliance report for at least one inspection region, wherein the at least one inspection region includes at least a portion of the geographic region, and wherein the regulatory compliance report is generated at least partially from at least one of inputted data and data received from the at least one host; or any combination thereof.

16. The system of claim 8, wherein the program further causes the device to display impact data configured to represent an estimated impact that at least one genetically modified crop will have on at least a portion of land associated with the geographic location.

17. The system of claim 16, wherein the estimated impact is at least partially determined from an amount of the at least a portion of land that the at least one genetically modified crop can be grown on, and wherein the estimated impact at least partially comprises at least one of the following: crop production impact of growing the at least one genetically modified crop on the at least a portion of land, profit impact for growing the at least one genetically modified crop on the at least a portion of land, or any combination thereof.

18. The system of claim 8, wherein the program further causes the device to display a graphical user interface comprising at least one of the following: zoom tool, search tool, directional movement tool, scope, compass, point placement tool, or any combination thereof.

19. The system of claim 18, wherein the graphical user interface comprises the point placement tool, and wherein the point placement tool accepts user input and, based at least partially on the user input, causes at least one point to be displayed on the device, the at least one point associated with at least one geographic coordinate and a characteristic associated with the at least one geographic coordinate.

20. A computer-implemented method for determining the compliant application of agricultural chemicals performed on at least one computer system including at least one processor and at least one shape determination module, the method comprising:
  receiving, from a mobile device, location data relating to a geographical position of the mobile device;
  identifying topographical data relating at least partially to the geographical position;
  transmitting, to the mobile device, map data and shape data, wherein the map data allows the mobile device to display a visual image representing a geographical region at least partially corresponding to the geographical position, and wherein the shape data is in the form of at least one shape file and is configured to cause the mobile device to display at least one shape representing at least a portion of at least one specified area, and wherein the geographical region includes the at least a portion of the at least one specified area;
  receiving from an external topographical data source field area data relating to the geographical position of the mobile device, wherein the field area data is received from at least one of the following: the mobile device, the at least one topographical data source, a local data source, a remote data source, or any combination thereof;
  wherein at least a portion of the topographical data comprises Extensible Markup Language (XML) data, and wherein at least part of the XML data at least partially represents at least one of the following: mark, image, polygon, three-dimensional models, textual descriptions, geographical coordinates, or any combination thereof;
  determining, based at least partially on regulatory data and the field area data, regulatory compliance data relating to at least one crop area, wherein the regulatory compliance data indicates whether the at least one crop area is in compliance with at least one regulation;
  providing positioning coordinates to an applicator system or automatic applicator equipment; and
  applying at least one agricultural chemical in a compliant manner as indicated by the regulatory compliance data using the applicator system or automatic applicator equipment;
  wherein the at least one shape file is generated by the at least one shape determination module; and,
  wherein at least one shape file is stored in a shape file database.

21. The method of claim 20, further comprising displaying at least one buffer region in relation to the at least one specified area.

22. The method of claim 21, wherein at least one of a position, shape, and size of the at least one buffer region is at least partially determined by at least one of the following: regulatory requirements, water sources, crop type, crop treatment applications, or any combination thereof.

23. The method of claim 21, wherein at least one of a size, shape, and location of the at least one buffer region is influenced by wind speed data, and wherein the wind speed data is received from at least one of the mobile device and an external data source.

24. The method of claim 21, wherein an outer perimeter of the at least one buffer region is generated by calculating a predetermined distance from an outer perimeter of the at least one shape.

* * * * *